US011042381B2

(12) United States Patent
Harper, III et al.

(10) Patent No.: US 11,042,381 B2
(45) Date of Patent: Jun. 22, 2021

(54) REGISTER RENAMING-BASED TECHNIQUES FOR BLOCK-BASED PROCESSORS

(71) Applicant: Microsoft Technology Licensing, LLC, Redmond, WA (US)

(72) Inventors: David T. Harper, III, Seattle, WA (US); Gagan Gupta, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 135 days.

(21) Appl. No.: 16/214,040

(22) Filed: Dec. 8, 2018

(65) Prior Publication Data

US 2020/0183695 A1 Jun. 11, 2020

(51) Int. Cl.
*G06F 9/38* (2018.01)
*G06F 9/30* (2018.01)
*G06F 9/35* (2018.01)

(52) U.S. Cl.
CPC ............ *G06F 9/384* (2013.01); *G06F 9/3012* (2013.01); *G06F 9/35* (2013.01); *G06F 9/3802* (2013.01)

(58) Field of Classification Search
None
See application file for complete search history.

(56) References Cited

U.S. PATENT DOCUMENTS

| 7,228,402 B2 | 6/2007 | Rychlik et al. |
| 7,428,631 B2 | 9/2008 | Ruple et al. |
| 8,078,854 B2 | 12/2011 | Vick et al. |

(Continued)

FOREIGN PATENT DOCUMENTS

| WO | 2013081556 A1 | 6/2013 |
| WO | 2016140756 A1 | 9/2016 |

OTHER PUBLICATIONS

Burger, et al., "Scaling to the End of Silicon with EDGE Architectures", In Journal of the IEEE Computer Society, vol. 7, Issue 7, Jul. 1, 2004, pp. 44-55.

(Continued)

*Primary Examiner* — John M Lindlof
(74) *Attorney, Agent, or Firm* — Fiala & Weaver P.L.L.C.

(57) ABSTRACT

Techniques described herein are directed to ensuring register data consistency between different instruction blocks. For example, a block-based processor renames registers during block decode, but delays the update of a logical register-to-physical register mapping utilized by other instruction blocks until it is determined that a write instruction configured to write to a logical register commits. Alternatively, the processor renames registers during block decode and updates the mapping accordingly. However, the update is negated (e.g., rolled back) if the write instruction is not executed. Still further, the processor may analyze the instructions in the block to determine instructions configured to write to a logical register but that will not execute due to a mismatched predicate. Based on the determination, the block-based processor ensures data consistency by copying data from a previously-assigned register to a newly-assigned register. Techniques may also be utilized to assist the block-based processor in determining such instructions.

20 Claims, 10 Drawing Sheets

(56) References Cited

U.S. PATENT DOCUMENTS

| | | |
|---|---|---|
| 9,946,550 B2 | 4/2018 | Rangan et al. |
| 2004/0210886 A1 | 10/2004 | Jarp et al. |
| 2008/0114966 A1* | 5/2008 | Begon .................. G06F 9/3863 |
| | | 712/217 |
| 2009/0287908 A1 | 11/2009 | Rangan et al. |
| 2011/0238962 A1 | 9/2011 | Cain et al. |
| 2016/0179532 A1 | 6/2016 | Wright |
| 2016/0179538 A1 | 6/2016 | Collins et al. |
| 2016/0259645 A1* | 9/2016 | Wright .................... G06F 9/384 |
| 2016/0378661 A1* | 12/2016 | Gray .................. G06F 11/3433 |
| | | 712/237 |
| 2017/0083329 A1* | 3/2017 | Burger ................ G06F 9/30098 |
| 2018/0032335 A1 | 2/2018 | Smith et al. |
| 2018/0165199 A1 | 6/2018 | Brandt et al. |

OTHER PUBLICATIONS

"International Search Report and Written Opinion Issued in PCT Application No. PCT/US2019/62928", dated Mar. 16, 2020, 40 Pages.

Smith, et al., "Compiling for EDGE Architectures", In Proceedings of the International Symposium on Code Generation and Optimization, Mar. 26, 2006, pp. 185-195.

* cited by examiner

REGISTER RENAMING-BASED TECHNIQUES FOR BLOCK-BASED PROCESSORS

BACKGROUND

A block-based processor is a computer processor that implements a block-based processor instruction set architecture (BB-ISA) that enables instructions to be grouped in blocks in a manner that enables parallel execution. A block-based processor may include multiple block-based processing cores that execute a computer program implemented in the form of multiple instruction blocks. The block-based processing cores may share resources with each other. A block-based processor may offer more efficient computer program execution versus other processor types.

Predication is an architectural feature of computer programs providing an alternative to conditional branch instructions. Predication may work by executing instructions from both paths of the branch and only permitting those instructions from the taken path to modify architectural state. The instructions from the taken path are permitted to modify architectural state because they have been associated (predicated) with a "predicate"—a Boolean value used by the instruction to control whether the instruction is allowed to modify the architectural state or not. Predication may be used to convert branch instructions, which cause changes in the control flow of programs, to data values, which can guard instructions, and may determine which instructions are executed and which are not. Predication can linearize control flow, facilitating instructions to be provided down both possible paths which a branch may take to be collapsed. All the instructions may be fetched, but only some may commit depending on the predicate.

While predication can be effective, it can be problematic in instances where instructions configured to write to a register are renamed, but not executed due to a non-matching predicate. This is especially true when predication is utilized in block-based processors, where all instances of a logical register specified by write instructions are renamed. In the event that one such write instruction is not executed due to a non-matching predicate, subsequent instruction blocks utilizing the logical register may receive inconsistent data.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques described herein are directed to ensuring register data consistency between different instruction blocks. Such techniques ensure that program code implemented according to a block-based processor instruction set executes correctly when a processor implements register renaming. Techniques detect the condition in which a renamed register is not updated due to predication, and ensure that consumers of the register receive the correct value.

For example, in one embodiment, a block-based processor may rename registers during block decode, but delay the update of a map table that maintains a logical register-to-physical register mapping, and is utilized by other instruction blocks, until a determination is made that a write instruction configured to write to a logical register commits. If the write instruction is not executed, then the map table is not updated and subsequent instruction blocks will not utilize the incorrect mapping. In another embodiment, the block-based processor renames registers during block decode and updates the map table accordingly. However, the update is negated (e.g., rolled back) if the write instruction is not executed. In yet another embodiment, the block-based processor analyzes the instructions in the instruction block to determine instructions configured to write to a logical register but that will not execute due to a mismatched predicate. Based on the determination, the block-based processor may ensure data consistency by copying data from a first physical register that was assigned to the logical register at the time the instruction block was fetched to a second physical register that was assigned to the logical register during the decode of the instruction block. Techniques may also be utilized to assist the block-based processor in determining such instructions. For instance, a compiler may determine such instructions and explicitly predicate these instructions, thereby enabling the block-based processor to quickly identify such instructions.

Further features and advantages of the disclosed embodiments, as well as the structure and operation of various embodiments disclosed herein, are described in detail below with reference to the accompanying drawings. It is noted that the disclosed embodiments are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
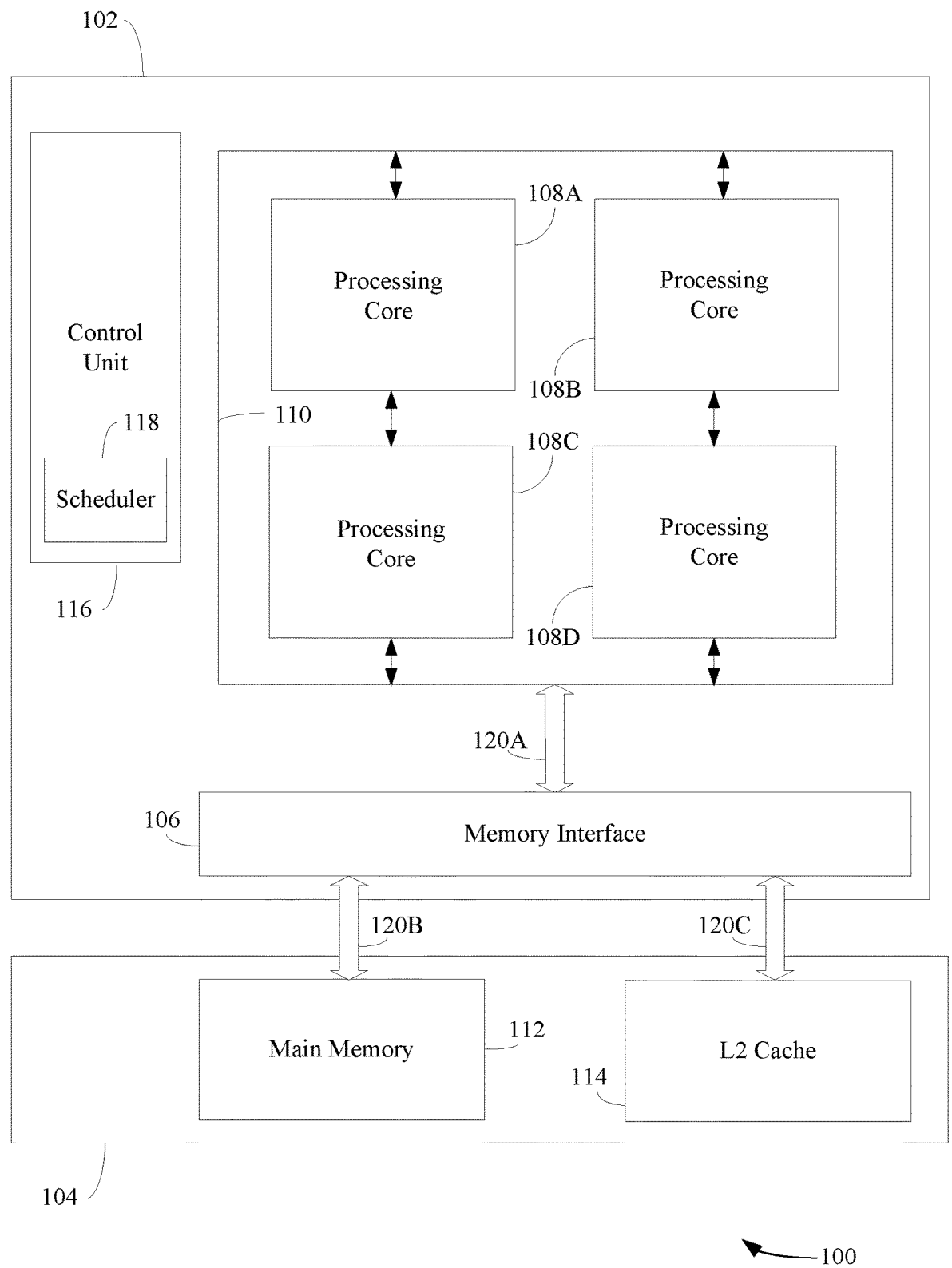
FIG. 1 shows a block diagram of an example system for ensuring register data consistency, according to an example embodiment.

The features and advantages of the present embodiments will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features disclosed herein. The scope of the present embodiments is not limited to the description provided herein. The features disclosed herein merely exemplify the disclosed embodiments, and modified versions of the features disclosed herein are also encompassed by the present embodiments. The embodiments described herein are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments for Ensuring Register Data Consistency

In a block-based architecture (e.g., an Explicit Data Graph Execution (EDGE) architecture), all register reads during the execution of an instruction block return the value that was stored in the register when the block began execution (also referred as to the block entry value). That is, no values written to a register during the execution of a block are made available to instructions within that block. Furthermore, a block-based architecture such as the EDGE architecture may require that a particular register may be written to at most once within a particular block. Multiple writes to a given register within a single instruction block may generate an exception. This does not preclude multiple static instructions targeting a specific register as long as at most one of the static instructions generates a write to the register. This implies that if there is more than one static write instruction to a register, all of the writes must be predicated (either explicitly or implicitly), with mutually exclusive predicates (so that only one write instruction executes).

Accordingly, a given logical register must be renamed with the same physical register name in all instances within a block so that the same physical register is mapped to the given logical register at block termination. However, in instruction blocks where write instructions to a register are predicated (either explicitly or implicitly), there is no guarantee that a write to the register will occur. In situations where registers are not renamed, this is not an issue. However, if the physical register mapping for the register is different at block termination than it was at block entry, then the register will potentially have an incorrect value because the register will be mapped to a physical register that has not been written.

Techniques described herein are directed to ensuring register data consistency between different instruction blocks, thereby remedying the above issues. For example, in one embodiment, a block-based processor may rename registers during block decode, but delay the update of a map table that maintains a logical register-to-physical register mapping, and is utilized by other instruction blocks, until it is determined that a write instruction configured to write to a logical register commits. If the write instruction is not executed, then the map table is not updated and subsequent instruction blocks will not utilize the incorrect mapping. In another embodiment, the block-based processor renames registers during block decode and updates the map table accordingly. However, the update is negated (e.g., rolled back) if the write instruction is not executed. In yet another embodiment, the block-based processor analyzes the instructions in the instruction block to determine instructions configured to write to a logical register but that will not execute due to a mismatched predicate. Based on the determination, the block-based processor may ensure data consistency by copying data from a first physical register that was assigned to the logical register at the time the instruction block was fetched to a second physical register that was assigned to the logical register during the decode of the instruction block. Techniques may also be utilized to assist the block-based processor in determining such instructions. For instance, a compiler may determine such instructions and explicitly predicate these instructions, thereby enabling the block-based processor to quickly identify such instructions.

FIG. 1 shows a block diagram of an example system 100 for ensuring register data consistency, according to an example embodiment. As shown in FIG. 1, system 100 includes a block-based processor 102 and a memory system 104. Block-based processor 102 and memory system 104 are communicatively coupled via a memory interface 106 and one or more buses 120A-120C. Block-based processor 102 may comprise a plurality of processing cores 108A-108D and a core interconnect 110. Core interconnect 110 may be configured to transmit data, control signals and/or other information signals between each of processing cores 108A-108D. For example, each of processing cores 108A-108D may receive and/or transmit semaphores that specify the execution status of instructions currently being executed thereby via core interconnect 110. Core interconnect 110 may also be coupled to memory interface 106 (via bus 120A) and transmit data and/or control signals between each of processing cores 108A-108D and memory system 104 (via memory interface 106 and bus 120B and/or bus 120C). Core interconnect 110 and/or buses 120A-120C may each be implemented via one or more wires, traces, or other form of routing/interconnect; however, the embodiments described herein are not so limited.

Each of processing cores 108A-108D may be configured to operate in accordance with a block-based architecture, such an explicit data graph execution (EDGE) architecture. In accordance with a block-based architecture, a program is encoded by grouping a plurality of one or more instructions into an atomic block (referred to as an instruction block). An atomic block includes a set of instructions that can be executed "atomically" in the sense they may be executed in isolation from, and without interaction with the rest of the program code (appear to the rest of the program code to occur as a single operation without interruption). Each of processing cores 108A-108D is configured to fetch, execute, and commit such instruction blocks atomically. When an instruction block is committed, results (e.g., memory and/or register values, register mappings, etc.) from executing the instructions of the instruction block are made available to other instruction blocks. It is noted that while FIG. 1 shows block-based processor 102 as including four processing cores 108A-108D, block-based processor 102 may include any number of processing cores.

Memory interface 106 may comprise interface logic configured to connect to block-based processor 102 to memory system 104. Memory system 104 may comprise a level 2 (L2) cache 112 and main memory 114. L2 cache 112 may comprise static random access memory (SRAM), and main memory 114 may comprise dynamic RAM (DRAM). In accordance with an embodiment, memory system 104 may be included on the same integrated circuit as block-based processor 102. In accordance with another embodiment, memory system 104 may be external to the integrated circuit on which block-based processor 102 is included.

Instructions within an instruction block may communicate with each other through memory (e.g., main memory 112, L2 cache 114, etc.) and/or or operand buffers (also referred to as temporaries). Each instruction in a block is allotted necessary operand buffers to hold source operands at least until the instruction can be executed. An instruction of the block can be executed once all of the operands needed by the instruction are received. Instructions of one instruction block may provide results to instructions of another instruction block through memory and/or general-purpose registers of block-based processor 102. Each block may comprise up to a predetermined number of instructions (e.g., 32, 64, 128, etc.).

Each of processing cores 108A-108D may comprise a level 1 (L1) cache (not shown in FIG. 1) for storing instruction blocks and/or data. Each of processing cores 108A-108D may be configured to retrieve instruction blocks and/or data from the L1 cache. In the event that requested instructed blocks and/or data are not located in the L1 cache, the requested blocks and/or data may be retrieved from a higher-level memory (e.g., L2 cache 114 or main memory 112).

Each of processing cores 108A-108D may be configured to perform several optimizations for executing an instruction block, including, but not limited to, speculative instruction execution, branch prediction, and register renaming. Register renaming may be utilized to remove register dependencies that are created by the limited number of registers utilized by each of processing cores 108A-108D. Each of processing cores 108A-108D may perform register renaming by mapping the architectural registers referenced within instruction fields to physical registers of the processing core. Each instruction that utilizes data written to such logical registers (i.e., dependent instructions) also have its registers renamed.

Block-based processor 102 may also comprise a control unit 116. Control unit 116 may be configured to monitor the operation of block-based processor 102. Examples of operations include, but are not limited to, the allocation and/or deallocation of each of processing cores 108A-108D for performing instruction processing, the controlling of input and/or output data between any of processing cores 108A-108D (and components included therein, e.g., a register file) and/or memory interface 106, the modification of execution flow, the verifying of target location(s) of predicate instructions, instruction headers, and other changes in control flow, etc. Control unit 116 may be further configured to process hardware interrupts, control the reading and/or writing of special system registers (e.g., a program counter), etc. Control unit 116 may be implemented using a non-block-based processor (e.g., a general-purpose processing core), or alternatively, may be included in one or more of processing cores 108A-108D.

Control unit 116 may comprise a scheduler 118. Scheduler 118 may be configured to allocate instructions blocks for each of processing cores 108A-108D. For instance, scheduler 118 may initiate instruction block mapping, fetching, decoding, execution, committing, aborting, idling, and refreshing for each of processing cores 108A-108D. Scheduler 118 may assign one or more instruction blocks to each of processing cores 108A-108D during instruction block mapping. It is noted that the processor stages described herein are for illustrative purposes, and in some examples, certain operations can be combined, omitted, separated into multiple operations and/or stages.

In a block-based architecture, all register reads during the execution of a block return the value that was stored in the register when the block began execution (also referred as to the block entry value). That is, no values written to a register during the execution of an instruction block are made available to instructions within that block. Furthermore, block-based architectures may require that a particular register may be written to at most once within a particular block. Multiple writes to a given register within a single block may generate an exception. This does not preclude multiple static instructions targeting a specific register as long as at most one of the static instructions generates a write to the register. This implies that if there is more than one static write instruction to a register, all of the write instructions must be predicated (either explicitly or implicitly), with mutually exclusive predicates. Accordingly, a given logical register must be renamed with the same physical name in all instances within an instruction block so that the same physical register is mapped to the given logical register at block termination.

However, in blocks where writes to a register are predicated (either explicitly or implicitly), there is no guarantee that a write to the register will occur. In situations where registers are not renamed, this is not an issue. However, if the physical register remapping for the register is different at block termination than it was at block entry, then the register will potentially have an incorrect value because the register will be mapped to a physical register that has not been written. In accordance with an embodiment, each of processing cores 108A-108D may be configured to determine whether a renamed register is not updated due to predication and ensure that consumers of the register (e.g., instructions in other instruction blocks) receive the correct value. The foregoing may be implemented in one or more pipelining stages of a processing core, including, but not limited to the fetch stage, decode stage, and/or execution stage. Additional details regarding such techniques are provided below with reference to FIG. 2.

Figure 2:
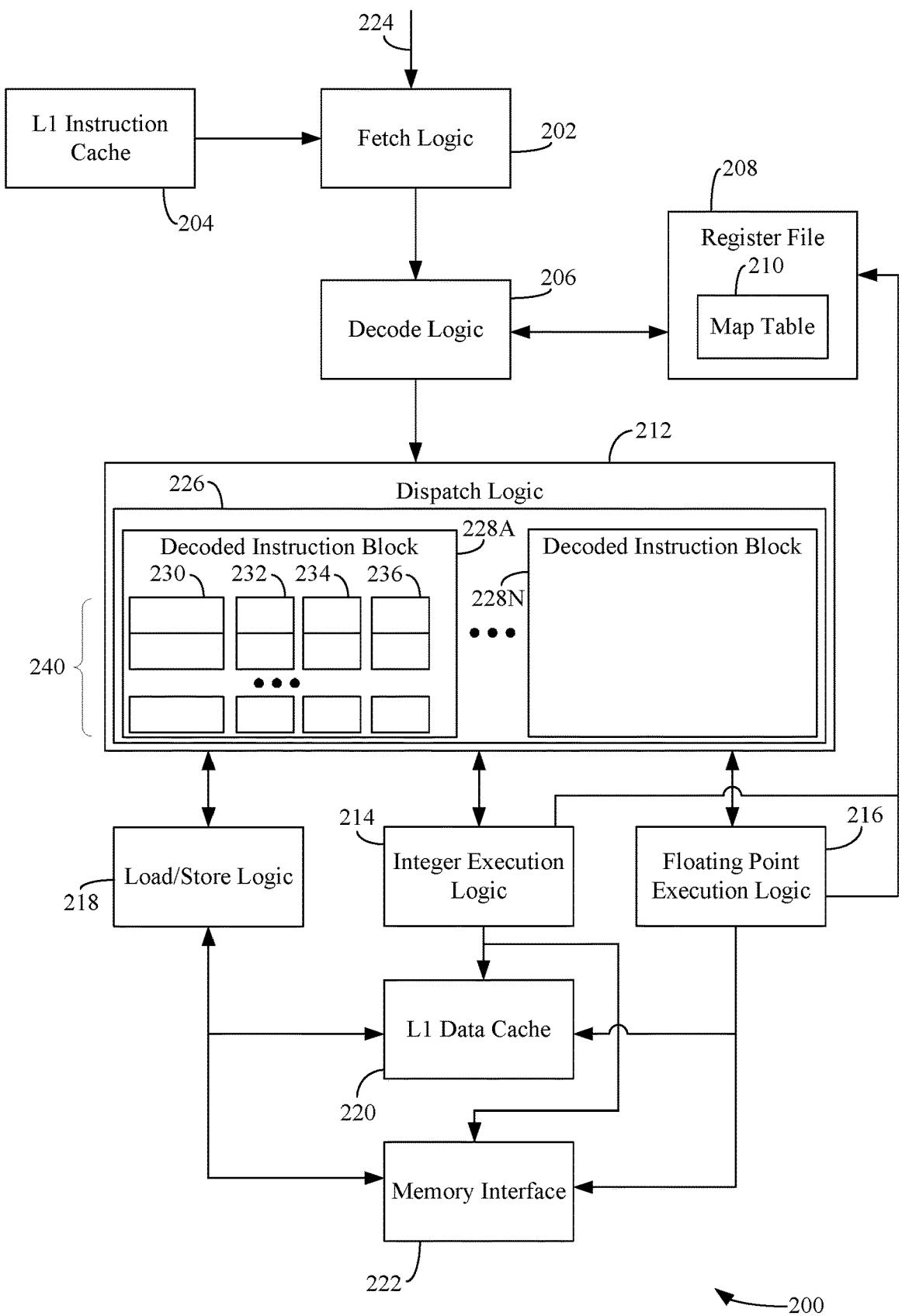
FIG. 2 shows a block diagram of a processing core configured to ensure data register data consistency, according to an example embodiment.

FIG. 2 shows a block diagram of a processing core 200 configured to ensure data register data consistency, according to an example embodiment. Processing core 200 is an example of processing cores 108A-104D, as described above with reference to FIG. 1. As shown in FIG. 2, processing core 200 includes fetch logic 202, an L1 instruction cache 204, decode logic 206, a register file 208, dispatch logic 212, integer execution logic 214, floating point execution logic 216, load/store logic 218, an L1 data cache 220, and a memory interface 222. Memory interface 222 is an example of memory interface 106, as described above with reference to FIG. 1.

Fetch logic 202 may be configured to retrieve instruction block(s) from L1 instruction cache 204 and/or receive instruction block(s) from other processing cores e.g., via a core interconnect 224. Core interconnect 224 is an example of core interconnect 110, as described above with reference to FIG. 1. It is noted that fetch logic 202 may also be configured to retrieve instructions from other memories coupled thereto, including, but not limited to an L2 cache (e.g., L2 cache 114, as shown in FIG. 1) or main memory (e.g., main memory 112, as shown in FIG. 1). Once the instruction block(s) have been fetched, the instruction block(s) may be provided to decode logic 206.

Register file 208 may include a physical register file comprising a plurality of physical registers. The physical registers may be defined in accordance with a block-based processor architecture (e.g., an EDGE architecture). By way of example, and not by way of limitation, register file 208 may include 128 physical registers. Each physical register may store a predetermined number of bits of data (e.g., 32 bits, 64 bits, etc.). Register file 208 may be implemented using latches, SRAM, or other forms of memory storage.

Decode logic 206 may decode instruction headers and/or instructions of instruction block(s) and store the decoded instructions in an instruction buffer 226 maintained by dispatch logic 212. For example, decode logic 206 may determine an opcode of an instruction, one or more source and/or destination operations for an instruction, and a displacement value (if the instruction is a load or store) of an instruction. In accordance with a block-based architecture, instructions may also specify a target operand of a subsequent instruction within the instruction block to which the instruction's result is to be forwarded. Accordingly, decode logic 206 may be further configured to determine target operands of subsequent instructions.

Instruction buffer 226 may be configured to receive and store decoded instruction block(s) (e.g., instruction blocks 228A-228N). Instruction buffer 226 may store instruction blocks 228A-228N in anticipation of execution of the instructions of instruction blocks 228A-228N. As shown in FIG. 2, each decoded instruction block comprises a plurality of decoded instructions 240. Each decoded instruction is associated with an opcode 230. a first operand buffer 232, a second operand buffer 234, and/or a predicate buffer 236. Opcodes 230 may be determined by decode logic 206 during the decode of the instructions. First operand buffer 232 may be configured to store the first operand of an instruction, and second operand buffer 234 may be configured to store a second operand of an instruction. The operands stored in first operand buffer 232 and right operand buffer 234 may comprise register values read from register file 208, data received from a memory (L1 data cache 220, L2 cache 114, main memory 112, etc.), immediate operands coded within an instruction, or operand values calculated by an earlier-issued instruction. First operand buffer 232 and second operand buffer 234 may store operands until their respective decoded instructions are ready to execute. Predicate buffer 236 may store predicate results (e.g., that are evaluated by a predicate instruction). Instruction operands for a given instruction are read from that instructions operand buffers 232 and 234, and predicate results are read from predicate buffer 236.

Once an instruction of an instruction block has all the necessary operands and/or predicate results, it is ready for execution. Results of a first instruction in the instruction block are provided to operand buffers of subsequent instructions in the instruction block. For instance, consider the following instruction sequence below:

| I[0]: | read | R0, I[2].0 |
| I[1]: | read | R7, I[2].1 |
| I[2]: | add | |

The first instruction, I[0], reads data from a logical register R0. The results of the read operation are provided to the first operand buffer (e.g., first operand buffer 232) of the third instruction, I[2], which is an addition instruction configured to add operands stored in its respective operand buffers. The second instruction, I[1], reads data from logical register R7. The results of the second instruction are provided to the second operand buffer (e.g., second operand buffer 234) of the third instruction. Once the third instruction receives values for both of its operands, it is ready for execution. Thus, dispatch logic 212 issues (or dispatches) the instruction to execution logic (e.g., integer execution logic 214 or floating point execution logic 216) for execution.

Load and store instructions that are ready for execution are issued to load/store logic 218 by dispatch logic 212. Load/store logic 218 may load data for load instructions from L1 data cache 220. Where requested data is not located in L1 data cache 220, the requested data may be retrieved from a higher-level cache (such as the L2 cache 114) or main memory 112 via memory interface 222. Similarly, load/store logic 218 may store data in L1 data cache 220, or alternatively L2 cache 114 and/or main memory 112 via memory interface 222.

Load/store logic 218 may comprise one or more queues and/or buffers for receiving and temporarily storing information for performing load and store instructions. All memory access instructions of an instruction block may be executed as a single, atomic transactional block. In other words, either all or none of the memory access instructions are performed. The relative order in which memory access instructions is determined may be based on an identifier encoded within such instructions. In some examples, additional performance can be obtained by executing the memory access instructions out of the identifier-specified relative ordering. Load/store logic 218 also receives addresses for load instructions, and addresses and data for store instructions. In certain embodiments, load/store logic 218 waits to perform the queued memory access instructions until it is determined that its instruction block will actually commit. In other embodiments, load/store logic 218 may issue at least some memory access instructions speculatively, but will need to flush the memory operations in the event the block does not commit. Load/store logic 218 may be implemented using control logic (e.g., with a finite state machine) and memory (e.g., registers or SRAM) to execute the memory transactions and store memory instruction operands, respectively.

When an integer-based instruction (e.g., an integer addition instruction, an integer subtraction instruction, etc.) is ready for execution (i.e., the instruction has received all its operands), dispatch logic 212 may issue the integer-based instruction to integer execution logic 214. Integer execution logic 214 may comprise one or more integer algorithmic logic units (ALUs) configured to perform the integer-based operations corresponding to the integer-based instruction. Results of such instructions may be provided to the operand buffers of the target instruction specified by the integer-based instruction.

When a floating point-based instruction (e.g., a floating point addition instruction, a floating point subtraction instruction, etc.) is ready for execution (i.e., the instruction has received all its operands), dispatch logic 212 may issue the floating point-based instruction to floating point execution logic 216. Floating point execution logic 216 may comprise one or more floating point ALUs configured to perform the floating point-based operations corresponding to the floating point-based instruction. Results of such instructions may be provided to the operand buffers of the target instruction specified by the floating point-based instruction.

As shown, in one embodiment, L1 data cache 220 may be coupled to integer execution logic 214 and floating point execution logic 216, thereby enabling the integer execution logic 214 and floating point execution logic 216 to request data from the L1 data cache 220. In some cases, integer execution logic 214 and/or floating point execution logic 216 may request data not contained in the L1 data cache 220. Where requested data is not located in the L1 data cache 220, the requested data may be retrieved from a higher-level cache (such as the L2 cache 114) or main memory 112 via memory interface 222.

The instructions stored in each of instruction blocks 228A-228N may be executed atomically. Thus, updates to register file 208, L1 data cache 220, L2 cache 114 and/or main memory 112 affected by the executed instructions may be buffered locally within processing core 200 until the instructions are committed. Instructions of an instruction block may, for example, be committed when all register writes have been buffered and/or all memory writes have been buffered. An instruction block may be committed when updates to register file 208, L1 data cache 220, L2 cache 114 and/or main memory 112 have been completed.

Referring again to decode logic 206, decode logic 206 may be further configured to rename registers to eliminate certain data dependencies between instructions within an instruction block. For instance, after an instruction block has been fetched by fetch logic 202, decode logic 206 may analyze the instructions included therein to determine whether data dependencies exist. Upon determining whether such dependencies exist, decode logic 206 may rename logical registers specified by an instruction to available physical registers maintained by register file 208. For instance, upon determining a physical register that can be used in place of the logical register, decode logic 206 may utilize a map table 210 maintained by register file 208 to associate the logical register to the determined physical register. Map table 210 may comprise a logical register-to-physical register mapping. Each entry in map table 210 may specify a particular logical register and the physical register associated therewith. All the instructions of an instruction block utilizing the logical register may utilize the mapping maintained by map table 210 so that the associated physical register is used during execution. Subsequent instruction blocks (e.g., instruction block 228N) may also utilize the same mapping maintained by map table 214. When analyzing a subsequent instruction block, decode logic 206 may update the mapping in map table 210 depending on the data dependencies of the instructions included therein. For instance, a particular logical register may already be associated with a first physical register. After analyzing the instructions of the subsequent instruction block, decode logic 206 may determine that the particular logical register should be associated with a second physical register that is different than the first physical register and update map table 210 accordingly.

As described above, in instruction blocks where writes to a register are predicated, either explicitly or implicitly, there is no guarantee that a write to the register will occur. If the physical register mapping for the register is different when the block commits than it was at block entry (that is, decode logic 206 associates the logical register with a different physical register than the physical register specified by map table 210 when the instruction block is fetched), then the physical register will potentially have an incorrect value because the register will be mapped to a physical register that has not been written.

Consider the example set of instructions for an instruction block shown below:

| I[2]: | add    | I[3].0       |
| I[3]: | lei    | #5, I[4], I[6] |
| I[4]: | pt.add | I[5]         |
| I[5]: | st     | R1           |
| I[6]: | pf.add | ...          |

The predicate result is evaluated by instruction I[3], where the result of the addition of instruction I[2] is checked to see whether it is less than or equal to the value 5. If the predicate result is true, then instruction I[4] is executed. Otherwise, instruction I[6] is executed. Instruction I[4] is explicitly predicated on a true value of the evaluated predicate result (i.e., whether the predicate result evaluates to true). Instruction I[5] is implicitly predicated on the predicate result because it consumes the results from instruction I[4]. Instruction I[4] is configured to add the values stored in its operand buffers. The result is provided to the operand buffer of instruction I[5], which stores (or writes) the result of instruction I[4] to logical register R1. Suppose R1 was renamed to a first physical register (P1) at the time the instruction block containing the above code was fetched. Further suppose that decode logic 206 renamed R1 to a second physical register (P2) while decoding the instruction block (due to a write to R1 by instruction I[5]). References to R1 in the remaining and subsequent blocks are changed to P2 (until another write to R1 is detected in another block).

In the above code, if the predicate result evaluates to false (i.e., the result of the addition of instruction I[2] is not less than or equal to the value 5), instruction I[4] will not execute. I[5] will also not execute because no result will be calculated by the producer instruction I[4], and therefore the result will not be forwarded to the operand buffer of instruction I[5]. Consequently, R1, i.e., P2, will not be updated and subsequent blocks using P2 as reference to R1 will not receive the previous value (from P1), as they should have. Several techniques may be utilized to resolve this issue.

A. Delayed Updating of Map Table

Figure 3:
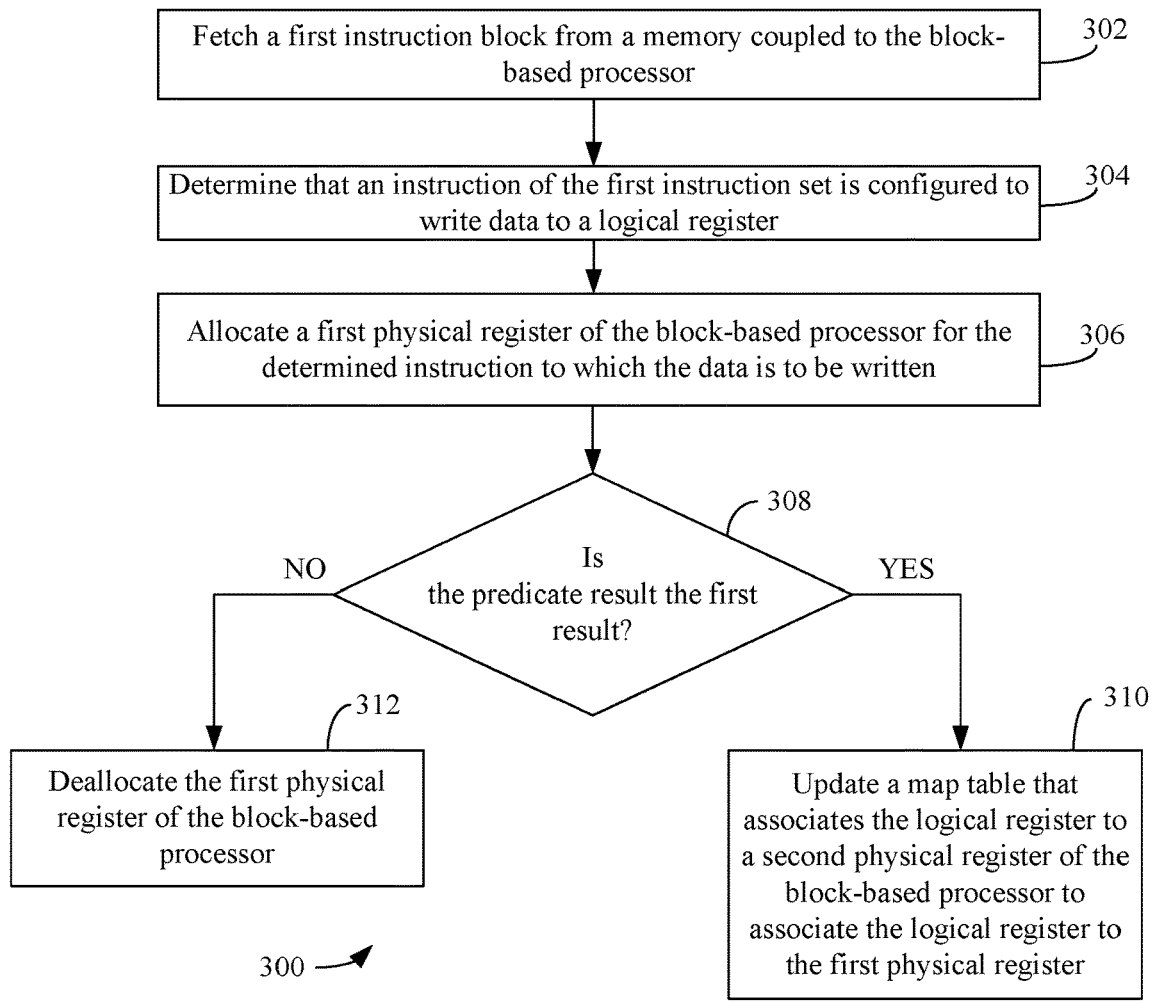
FIG. 3 is a flowchart for delaying the updating of a map table, according to an example embodiment.
Figure 4:
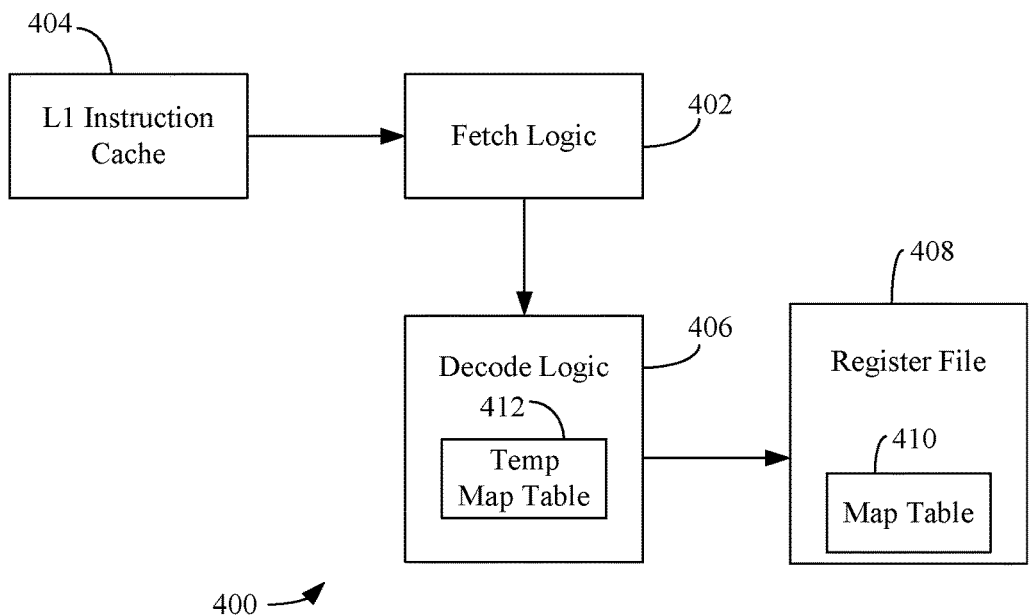
FIG. 4 depicts a block diagram of a processing core of a block-based processor that is configured to delay the update of a map table, according to an example embodiment.

In accordance with an embodiment, after decode logic 206 determines that certain logical registers specified by instructions in an instruction block are to be renamed, the update of map table 210 that associates the logical registers to their respective physical registers is delayed until such instructions are committed. For example, FIG. 3 is a flowchart 300 for delaying the updating of a map table in accordance with an embodiment. Flowchart 300 is described with respect to FIG. 4 for illustrative purposes. FIG. 4 shows a block diagram of a processing core 400 of a block-based processor (e.g., block-based processor 102, as shown in FIG. 1) that is configured to delay the update of a map table in accordance with an example embodiment. As shown in FIG. 4, processing core 400 comprises an L1 instruction cache 404, fetch logic 402, decode logic 406, and a register file 408. Register file 408 includes a map table 410. Processing core 400, L1 instruction cache 404, fetch logic 402, decode logic 406, register file 408, and map table 410 are examples of processing core 200, L1 instruction cache 204, fetch logic 202, decode logic 206, register file 208, and map table 210, as respectively described above with reference to FIG. 2. It is noted that processing core 400 includes additional components (e.g., the components described above with reference to FIG. 2) that are not shown for brevity. Flowchart 300 and processing core 400 are described as follows.

Flowchart 300 begins with step 302. In step 302, a first instruction block is fetched from a memory coupled to a block-based processor. The first instruction block comprises a predicate instruction configured to evaluate a predicate result, a first set of one or more instructions configured to execute based on the predicate result being a first result, and a second set of instruction(s) configured to execute based on the predicate result being a second result. For instance, with reference to FIG. 4, fetch logic 402 is configured to retrieve an instruction block from L1 instruction cache 404 (or a higher-level memory subsystem) and provides the instruction block to decode logic 406. The instruction block may include a predicate instruction configured to evaluate a predicate result, a first set of instruction(s) configured to execute based on the predicate result being a first result (e.g., true), and a second set of instruction(s) configured to execute based on the predicate result being a second result (e.g., false).

At step 304, a determination is made that an instruction of the first instruction set is configured to write data to a logical register. For example, with reference to FIG. 4, decode logic 406 may determine that an identified instruction of the first instruction set is configured to write data to a logical register. For instance, consider the example sequence of instructions provided below:

| I[2]: | add | I[3].0 |
| I[3]: | lei | #5, I[4], I[6] |
| I[4]: | pt.add | I[5] |
| I[5]: | st | R1 |
| I[6]: | pf.add | ... |

Decode logic 406 may analyze the instruction set and determine instruction I[5] is configured to write data to logical register R1.

At step 306, a first physical register of the block-based processor is allocated for the determined instruction to which the data is to be written. For instance, with reference to FIG. 4, decode logic 406 may determine an available physical register maintained by register file 408 that can be allocated for the logical register (e.g., R1). However, instead of updating map table 410, decode logic 408 may maintain and update a temporary map table 412. The update to temporary map table 412 associates the allocated physical register to the logical register. Each instruction that utilizes the logical register in the instruction block utilizes the mapping maintained by temporary map table 412. It is noted that map table 410 may initially associate the logical register with another physical register at the time the instruction block is fetched by fetch logic 404. It is further noted that any instructions in the instruction block configured to read data from the logical register may utilize the physical register associated with the logical register at the time the instruction block is fetched.

At step 308, a determination is made as to whether the predicate result of the predicate instruction is the first result. For instance, with reference to FIG. 4, decode logic 406 may determine whether the predicate result of the predicate instruction is the first result. In particular, decode logic 406 may read the register values to be evaluated from register file 408 and evaluate the predicate result of the predicate instruction. If a determination is made that the predicate result of the predicate instruction is the first result, flow continues to step 310. Otherwise, flow continues to step 312.

At step 310, a map table is updated that associates the logical register to a second physical register of the block-based processor to associate the logical register to the first physical register. The map table is utilized by a second instruction block. For example, with reference to FIG. 4, decode logic 406 may update map table 410 to disassociate the initial physical register associated with the logical register and associates the logical register with the physical register allocated in step 306. For instance, decode logic 406 may copy the mapping maintained to temporary map table 412 to map table 410.

In accordance with an embodiment, the updating of map table 410 may occur after the identified instruction has committed (i.e., after the data is written to the first physical register).

At step 312, the first physical register of the block-based processor is deallocated. For example, with reference to FIG. 4, decode logic 406 may remove the mapping maintained by temp map table 412 in response to determining that the predicate result of the predicate instruction is the second result. In such a scenario, map table 410 is not updated and the mapping maintained at the time the instruction block was fetched is not changed.

In accordance with one or more embodiments, instructions in the second instruction block that are configured to read data from the logical register are suspended from executing until the instruction of the first instruction block is committed. For instance, fetch logic 402 may fetch additional instruction block(s) subsequent to and/or at the same time as the first instruction block. Instructions of such instruction blocks that are configured to read data from the logical register may not issue and/or execute until the instruction (that is configured to write data to the logical register) of the first instruction block commits (e.g., in embodiments where these instructions are speculatively executed). This ensures that subsequent instruction blocks utilize a correct logical register-to-physical register mapping and that the subsequent instruction blocks utilize the correct register values.

In accordance with one or more embodiments, the second instruction block utilizes the updated map table when the identified instruction of the first instruction set executes and commits responsive to determining that the predicate result of the predicate instruction evaluates to the first result. For example, when map table 410 is updated in response to the predicate result of the predicate instruction being the first result, the updated mapping is utilized by other instruction blocks that include instructions that utilize the same logical register. It is noted that if subsequent instruction blocks include an instruction configured to write to the same logical register, decode logic 406 may update map table 410 to associate the logical register with a different physical register during the decode of such instruction blocks.

B. Map Table Update Negation

As described above with reference to FIG. 2, after decode logic 206 determines that certain logical registers specified by instructions in an instruction block are to be renamed, decode logic 206 updates map table 210 to associate the logical registers with physical registers. In accordance with an embodiment, the update may be negated if the physical register is never written to (e.g., the instruction configured to write to the register never executes and/or commits due to a mismatched predicate).

Figure 5:
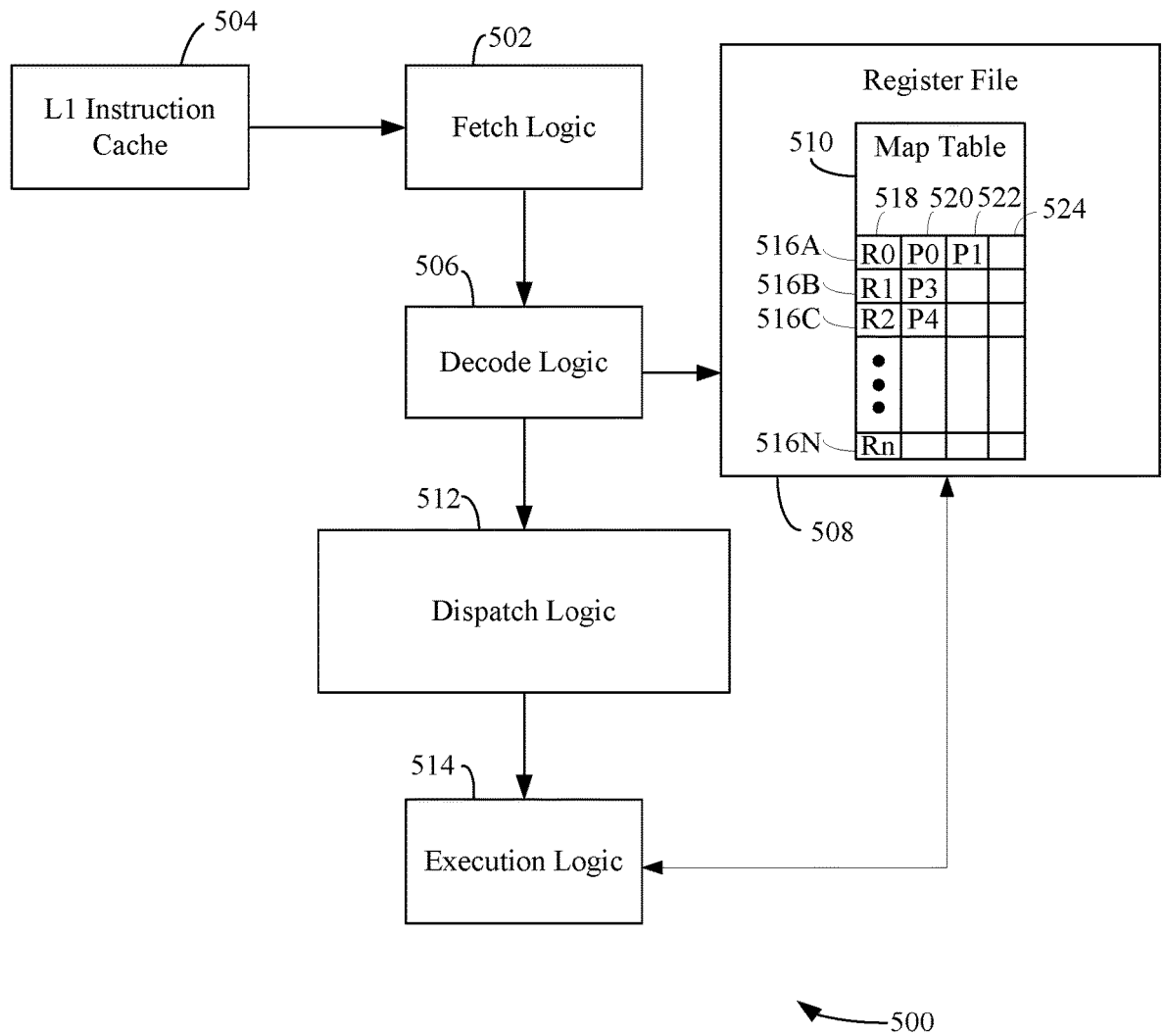
FIG. 5 depicts a block diagram of a processing core that is configured to negate an update to a map table, according to an example embodiment.

For example, FIG. 5 is a block diagram of a processing core 500 that is configured to negate an update to a map table in accordance with an example embodiment. As shown in FIG. 5, processing core 500 comprises an L1 instruction cache 504, fetch logic 502, decode logic 506, register file 508, dispatch logic 512, and execution logic 514. Register file 508 maintains a map table 510. Processing core 500, L1 instruction cache 504, fetch logic 502, decode logic 506, register file 508, dispatch logic 512, and execution logic 514 are examples of processing core 200, L1 instruction cache 204, fetch logic 202, decode logic 206, register file 208, dispatch logic 212, and execution logic 214, as respectively described above with reference to FIG. 2. It is noted that processing core 500 includes additional components (e.g., the components described above with reference to FIG. 2) that are not shown for brevity.

As shown in FIG. 5, map table 510 comprises a plurality of entries 516A-516N, where each entry represents a mapping between a particular logical register and a physical register. As shown in FIG. 5, each entry comprises a logical register column 518, an original physical register column 520, and a new physical register column 522. Original physical register column 520 stores the physical register mapped to the corresponding logical register (specified in logical register column 518) at the time the instruction block is fetched. For instance, entry 516A indicates that logical register R0 was mapped to physical register P0 at the time the instruction block was fetched, entry 516B indicates that logical register R1 was mapped to physical register P3 at the time the instruction block was fetched, and entry 516C indicates that logical register R2 was mapped to physical register P4 at the time the instruction block was fetched. New physical register column 522 stores the new physical register to which the logical register specified in logical register column 518 is renamed after decode logic 506 analyzes and decodes the instructions in the instruction block.

For example, suppose the instruction block fetched by fetch logic 502 includes an instruction configured to write to logical register R0. In this case, decode logic 506 updates map table to associate logical register R0 with an available physical register (e.g., physical register P1). In particular, decode logic 506 maps P1 to R0 by specifying P1 in new physical register column 522 for entry 516A.

As further shown in FIG. 5, map table may further comprise a write flag column 524 for each of entries 516A-516N. Write flag column 524 indicates whether the corresponding physical register was written to during execution of the instruction block (i.e., the write instruction has committed). For instance, write flag column 524 may store a value of '1' if the physical register was written to and a value of '0' if the physical register was not written to. After the instruction block is finished executing, execution logic 514 may determine whether a remapped logical register was written to by analyzing write flag column 524 of map table 510. If a write flag column 524 for a remapped register indicates that its corresponding physical register was not written to (due to a non-matching predicate), execution logic 514 may negate the update to map table 510 performed by decode logic 506. In accordance with an embodiment, execution logic 514 may negate the update by rolling back the update so that map table 510 associates the logical register to the original physical register it was mapped to (i.e., the register specified in original physical register column 520). For instance, execution logic 514 may send a control signal to register file 508 that causes register file 508 to remove the physical register specified in new physical register column 522 in map table 510. In accordance with another embodiment, execution logic 514 may copy data stored in the original physical register associated with the logical register to the newly-associated physical register. For instance, with reference to FIG. 5 execution logic 514 may send a control signal to register file 508 that causes register file 508 to copy the data stored in P0 to P1, thereby effectively negating the update to map table 510. If the write flag column 524 for a remapped logical register indicates that its corresponding physical register was written to, the updated mapping of map table 510 is maintained and utilized by subsequent instruction blocks.

Figure 6:
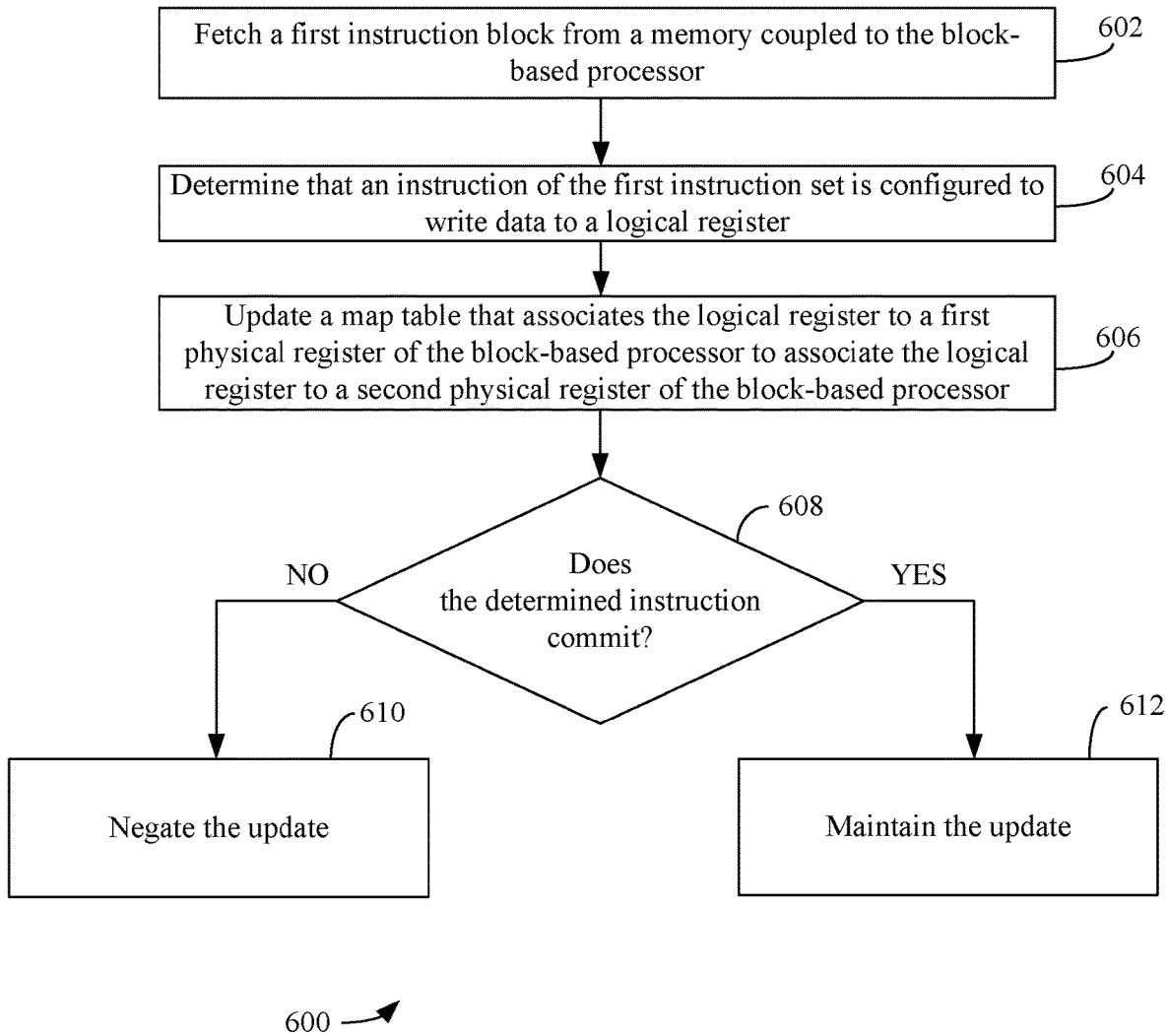
FIG. 6 depicts a flowchart for negating an update to a map table, according to an example embodiment.

Accordingly, updates to a map table may be negated in many ways. For example, FIG. 6 is a flowchart 600 for negating an update to a map table in accordance with an embodiment. Flowchart 600 is described with continued reference to FIG. 5. Flowchart 600 and processing core 500 are described as follows.

Flowchart 600 begins with step 602. In step 602, a first instruction block is fetched from a memory coupled to a block-based processor. The first instruction block comprises a predicate instruction configured to evaluate a predicate result, a first set of one or more instructions configured to execute based on the predicate being a first result, and a second set of instruction(s) configured to execute based on the predicate being a second result. For instance, with reference to FIG. 5, fetch logic 502 is configured to retrieve an instruction block from L1 instruction cache 504 (or a higher-level memory subsystem) and provides the instruction block to decode logic 506. The instruction block may include a predicate instruction configured to evaluate a predicate result, a first set of one or more instructions configured to execute based on the predicate result being a first result (e.g., true), and a second set of instruction(s) configured to execute based on the predicate result being a second result (e.g., false).

At step 604, a determination is made that an instruction of the first instruction set is configured to write data to a logical register. For example, with reference to FIG. 5, decode logic 506 may determine that an identified instruction of the first instruction set is configured to write data to a logical register.

At step 606, a map table is updated that associates the logical register to a first physical register of the block-based processor to associate the logical register to a second physical cal register of the block-based processor, the map table utilized by a second instruction block. For example, with reference to FIG. 5, decode logic 506 may update map table 510 (which associates the logical register to first physical register) to a second physical register of the block-based processor. For instance, if the logical register is R0, decode logic 506 updates new physical register column 522 of entry 516A to specify that P1 is now associated with R0, instead of P0.

At step 608, a determination is made as to whether the determined instruction commits. For example, with reference to FIG. 5, execution logic 514 may determine whether the identified instruction commits. If a determination is made that that the identified instruction does not commit, flow continues to step 610. Otherwise, flow continues to step 612.

In accordance with one or more embodiments, the determination is made by determining whether a write flag associated with the logical register is set in the map table. For example, with reference to FIG. 5, execution logic 514 may determine whether write flag column 524 associated with the logical register includes a value of '1'. For instance, if the logical register is R0, execution logic 514 determines whether write flag column 524 of entry 516A includes a value of '1'.

In accordance with one or embodiments, the write flag is set in response to the identified instruction being committed. For example, with reference to FIG. 5, execution logic 514 may write a value of '1' in write flag column 524 in response to the identified instruction being committed.

At step 610, in response to determining that the determined instruction does not commit, the update is negated. For example, with reference to FIG. 5, execution logic 514 negates the update.

In accordance with one or more embodiments, the negating comprises rolling back said updating so that the map table associates the logical register to the first physical register. For example, with reference to FIG. 5, execution logic 514 may send a control signal to register file 508 that causes register file 508 to remove the register specified by new physical register column 522 in map table 510. For instance, if the logical register specified by the identified instruction is R0, execution logic 514 may send a control signal to register file 508 that causes register file 508 to update map table 510 such that P1 is no longer specified in new physical register column 522 of entry 516A.

In accordance with one or more embodiments, the negating comprises copying data stored in the first physical register to the second physical register. For example, with reference to FIG. 5, execution logic 514 may send a control signal to register file 508 that causes register file 508 to copy the data stored in P0 to P1, thereby effectively negating the update to map table 510.

In accordance with one or more embodiments, the determined instruction does not commit in response to the predicate result being the second result.

At step 612, in response to determining that the determined instruction commits, the update of the map table is maintained.

C. Write Flag Based Old Physical Register to New Physical Register Copying

In accordance with an embodiment, logical registers that have been renamed to physical registers are always maintained regardless of whether an instruction configured to write data is executed. Different techniques may be utilized to achieve this depending on the types of instructions included in the instruction block. Such techniques are described below with reference to FIG. 7.

Figure 7:
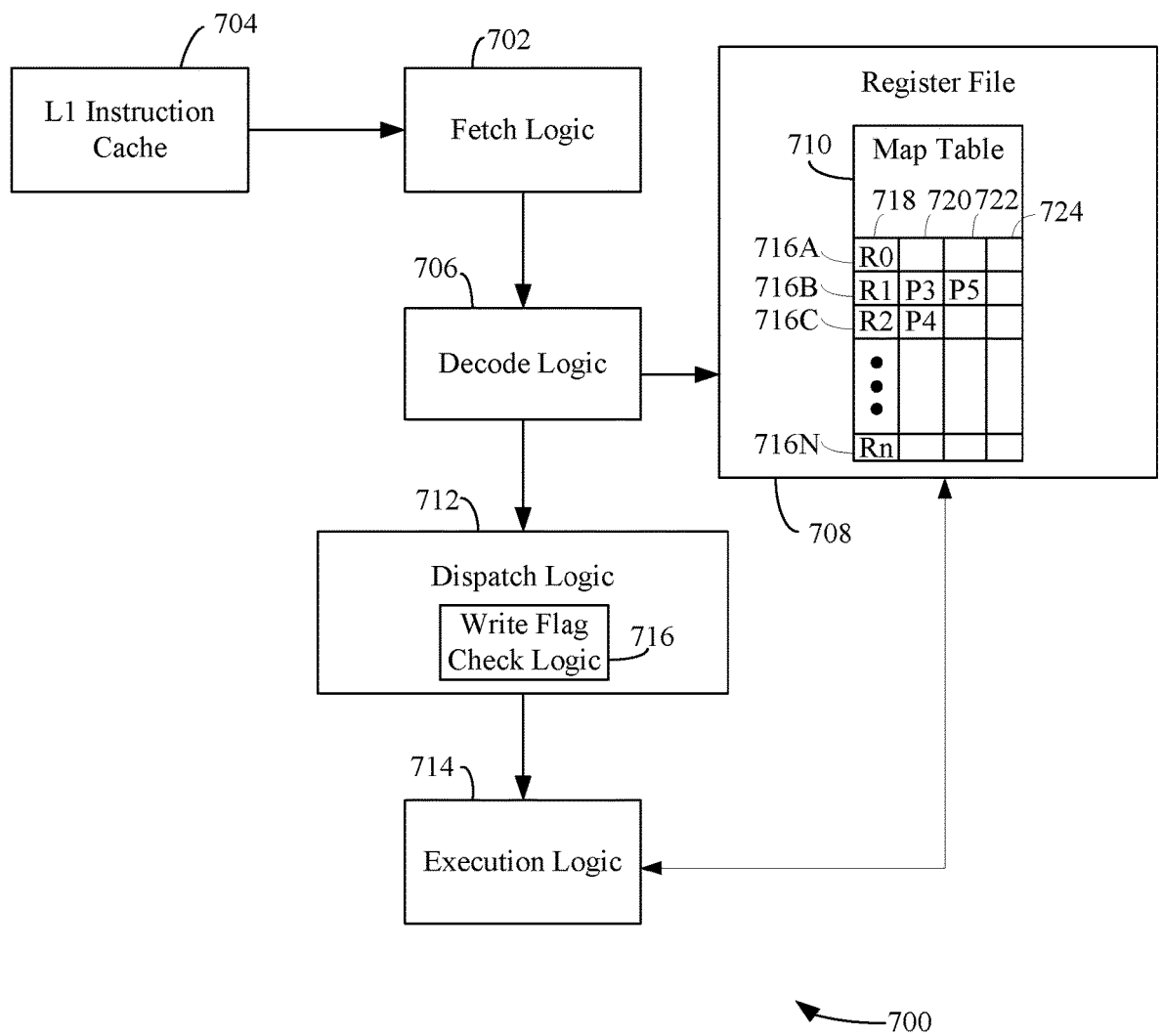
FIG. 7 shows a block diagram of a processing core that is configured to copy register values based on a write flag, according to an example embodiment.

FIG. 7 is a block diagram of a processing core 700 that is configured to copy register values based on a write flag in accordance with an example embodiment. As shown in FIG. 7, processing core 700 comprises an L1 instruction cache 704, fetch logic 702, decode logic 706, register file 708, dispatch logic 712, and execution logic 714. Register file 708 maintains a map table 710. Processing core 700, L1 instruction cache 704, fetch logic 702, decode logic 706, register file 708, dispatch logic 712, and execution logic 714 are examples of processing core 500, L1 instruction cache 504, fetch logic 502, decode logic 506, register file 508, dispatch logic 512, execution logic 514, and map table 510, as respectively described above with reference to FIG. 5. Dispatch logic 712 further comprises write flag check logic 716. It is noted that processing core 700 includes additional components (e.g., the components described above with reference to FIG. 2) that are not shown for brevity.

As shown in FIG. 7, map table 710 comprises a plurality of entries 716A-716N, and each entry comprises a logical register column 718, an original physical register column 720, a new physical register column 722, and a write flag column 724. Entries 716A-716N, logical register column 718, original physical register column 720, new physical register column 722, and write flag column 724 are examples of entries 516A-516N, logical register column 518, original physical register column 520, new physical register column 522, and write flag column 524, as described above with reference to FIG. 5.

Suppose a fetched instruction block comprises the following sequence of instructions:

| I[2]: | add    | I[3].0        |
| I[3]: | lei    | #5, I[4], I[6] |
| I[4]: | pt.add | I[5]          |
| I[5]: | st     | R1            |
| I[6]: | pf.ld  | R6, I[7].0    |

In the instructions above, if the predicate result evaluated by instruction I[3] evaluates to true (i.e., the result of the addition of instruction I[2] is less than or equal to the value 5), instructions I[4] and I[5] will execute. Instruction I[5] is configured to write to logical register R1. If the predicate result evaluated by instruction I[3] evaluates to false, instruction I[6] will execute, which reads the value stored in logical register R6 into the first operand of another instruction (i.e., instruction I[7]). In the sequence above, the only instruction configured to write to R1 is instruction I[5] (which is only written to if the predicate result evaluates to true). In accordance with map table 710, during the decode of the instruction sequence, decode logic 706 remaps logical register R1 from being associated with a first physical register (e.g., P3) to second physical register (e.g., P5). In the event that the predicate result evaluates to true, instruction I[5] executes and commits, P5 is written with the result of the addition instruction of instruction I[4], and execution logic 714 may set a write flag in write flag column 724 of entry 716B in map table 710, thereby indicating that P5 was written to. In this case, subsequent instruction blocks will receive the correct value for instructions that utilize logical register R1 (i.e., the value stored in P5) and no further action is required.

However, suppose the predicate result evaluates to false. In this case, instruction I[5] would not execute and commit, and the write flag would not be set. However, because decode logic 706 has renamed register R1 to P5 during the decode of the instructions, instructions of subsequent instruction blocks that reference R1 would utilize the value stored in P5, which, in this case, would not store the correct value because instruction I[5] did not execute.

To resolve this issue, the data stored in the old physical register (i.e., P3) is copied to the new physical register (i.e. P5). The copy operation may be performed after the instruction block commits. Alternatively, the copy operation may be performed after the decode logic determines that the predicate result evaluates to false. In accordance with an embodiment, the copy operation may occur in response to executing a write instruction inserted by a compiler. Such a technique is described below with reference to Subsection D.2.

In another scenario, suppose a fetched instruction block comprises the following instruction sequence:

| | | |
|---|---|---|
| I[2]: | add | I[3].0 |
| I[3]: | lei | #5, I[4], I[6] |
| I[4]: | pt.add | I[5] |
| I[5]: | st | R1 |
| I[6]: | pf.addi | R1, #4, R3 |

In the instructions above, if the predicate result evaluated by instruction I[3] evaluates to true (i.e., the result of the addition of instruction I[2] is less than or equal to the value 5), instructions I[4] and I[5] will execute. Instruction I[5] is configured to write to logical register R1. If the predicate result evaluates to false, instruction I[6] will execute, which adds the immediate value 4 to the value stored in logical register R3 and places the result in logical register R1. In the sequence above, both instructions I[5] and I[6] are configured to write to R1. However, only one of these instructions will execute based on whether the predicate result is true or false. During the decode of the instruction sequence, decode logic 706 may remap R1 from being associated with a first physical register (e.g., P3) to a second physical register (e.g., P5).

In the event that the predicate result evaluated by instruction I[3] evaluates to true, instruction I[5] executes and commits, P5 is written with the result of the addition instruction of instruction I[4], and execution logic 714 may set a write flag in write flag column 724 of entry 716B, indicating that P5 was written to. When instruction I[6] is evaluated by dispatch logic 712, dispatch logic 712 may determine instruction I[6] is not to be executed because the predicate result did not evaluate to false, and therefore does not dispatch instruction I[6] to execution logic 714. Write flag check logic 716 may determine whether the physical register mapped to R1 (i.e., P5) has been written to. For example, the write flag check logic 716 may determine whether the write flag in write flag column 724 of entry 716B is set. In this case, the write flag has been set, and no further action is required (that is, the data written to P5 is maintained).

However, suppose the predicate result evaluates to false. In this case, during evaluation of instructions I[4] and I[5], dispatch logic 712 may determine that these instructions are not to be executed because the predicate result did not evaluate to true, and therefore does not dispatch instructions I[4] and I[5]. In response, write flag check logic 716 may determine whether the write flag for logical register R0 has not been set. In this case, write flag check logic 716 determines that the write flag has not been set. In response, execution logic 714 may copy data stored in P3 to P5. During evaluation of instruction I[6], dispatch logic 712 may determine that this instruction is to be executed because the predicate result evaluated to false, and therefore, dispatches this instruction to execution logic 714. In response, execution logic 714 may execute instruction I[6] and set the write flag in write flag column 724 of entry 716B. The execution of instruction I[6] results in the value copied to P5 (during the evaluation of instructions I[4] and I[5]) being overwritten. Subsequent instruction blocks will utilize the overwritten value stored in P5.

Figure 8A:
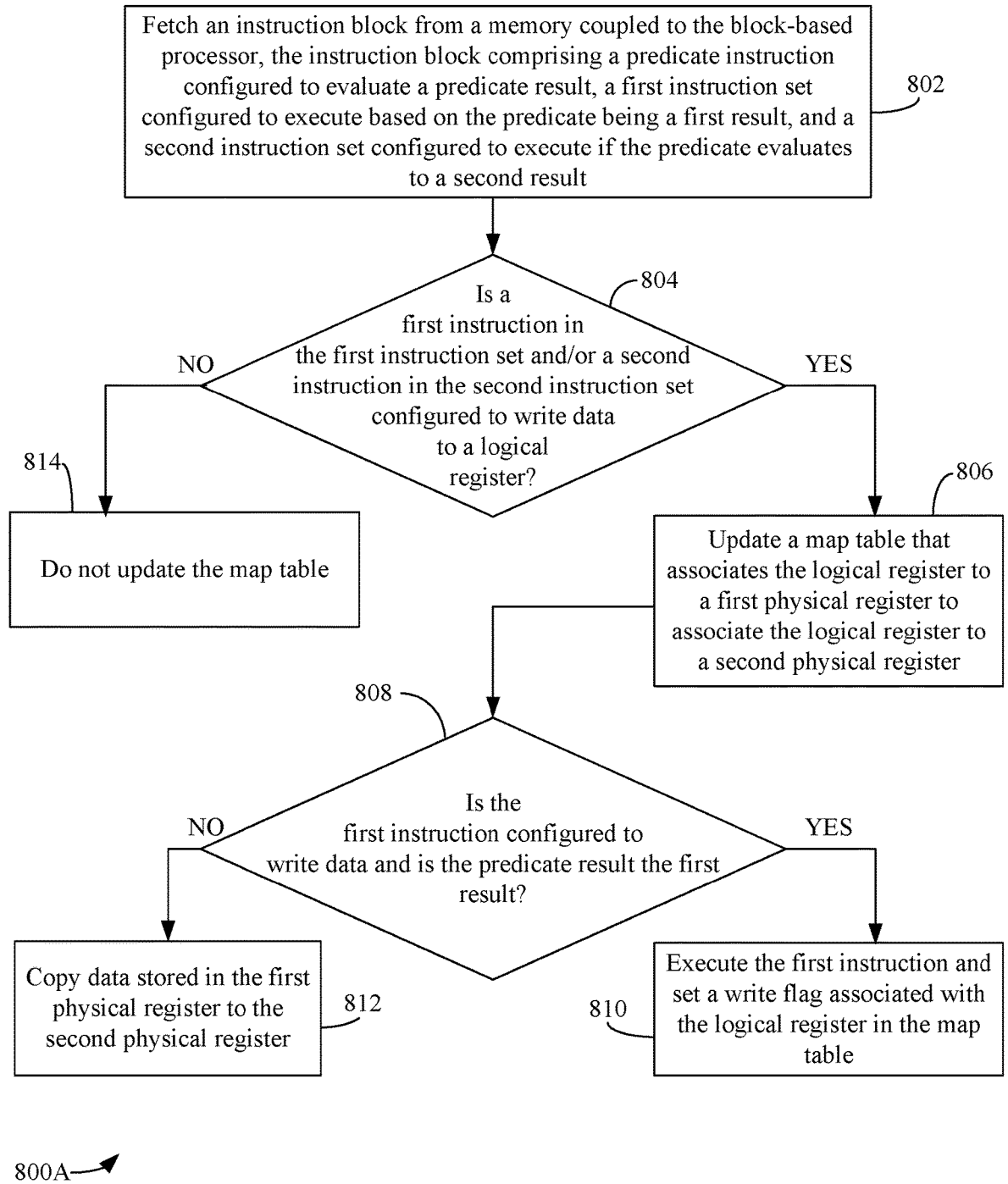
FIGS. 8A and 8B depict flowcharts for setting a write flag and copying register values based thereon, according to an example embodiment.
Figure 8B:
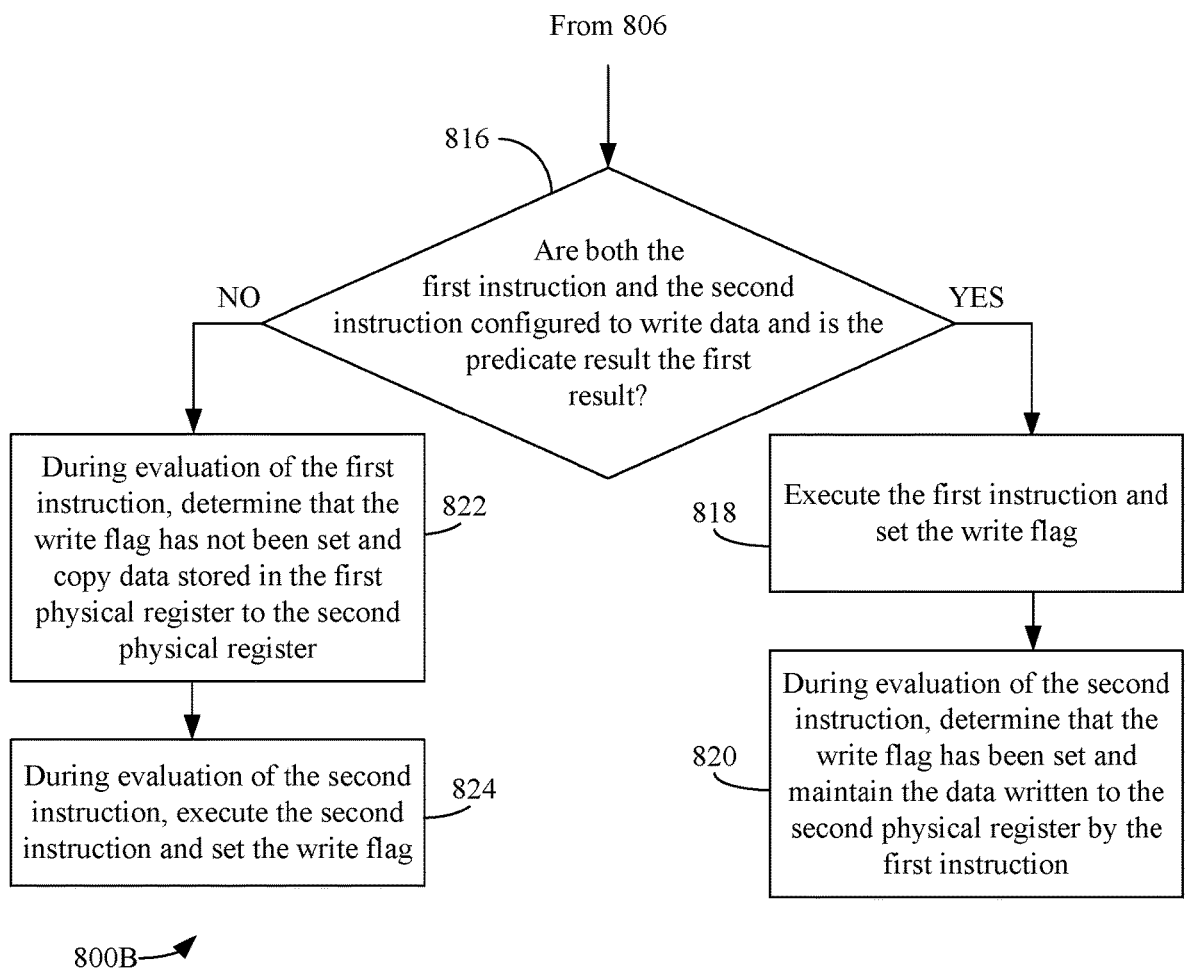

Accordingly, write flags may be set and register values may be copied based on a write flag in many ways. For example, FIGS. 8A and 8B are flowcharts 800A and 800B for setting a write flag and copying register values based thereon in accordance with an embodiment. Flowcharts 800A and 800B are described with continued reference to FIG. 7. Flowcharts 800A and 800B and processing core 700 are described as follows.

Flowchart 800A begins with step 802. In step 802, an instruction block is fetched from a memory coupled to a block-based processor. The instruction block comprises a predicate instruction configured to evaluate a predicate result, a first instruction set configured to execute based on the predicate result being a first result, and a second instruction set configured to execute based on the predicate result being a second result. For instance, with reference to FIG. 7, fetch logic 702 is configured to retrieve an instruction block from L1 instruction cache 704 (or a higher-level memory subsystem) and provides the instruction block to decode logic 706. The instruction block may include a predicate instruction configured to evaluate a predicate result, a first set of one or more instructions configured to execute based on the predicate result being a first result (e.g., true), and a second set of instruction(s) configured to execute based on the predicate result being a second result (e.g., false).

At step 804, a determination is made as to whether a first instruction of the first instruction set is configured to write data to a logical register and whether a second instruction of the second instruction set is configured to write data to the logical register. For example, decode logic 706 determines whether a first instruction of the first instruction set is configured to write data to a logical register and whether a second instruction of the second instruction set is configured to write data to the logical register. If a determination is made that a first instruction of the first instruction set and/or a second instruction of the second instruction set is configured to write data to the logical register, flow continues to step 806. Otherwise, flow continue to step 814.

At step 806, in response to a determination that at least one of the first instruction or the second instruction is configured to write data to the logical register, a map table that associates the logical register to a first physical register of a plurality of physical registers of the block-based processor is updated to associate the logical register to a second physical register of the plurality of physical registers. For example, with reference to FIG. 7, decode logic 706 updates map table 710 to associate the logical register (e.g., R1) with a new physical register (e.g., P5).

At step 808, a determination is made as to whether the first instruction is configured to write data and that the predicate result of the predicate instruction is the first result. For example, with reference to FIG. 7, decode logic 706 may determine whether the first instruction is configured to write data and that the predicate result of the predicate instruction is a first result. If a determination is made that the first instruction is configured to write data and that the predicate result of the predicate instruction is a first result, flow continues to step 810. Otherwise, flow continues to step 812.

At step 810, the first instruction is executed and a write flag associated with the logical register is set in the map table. The write flag indicates that the instruction has committed. For example, with reference to FIG. 7, execution logic 714 executes the first instruction and sets the write flag in map table 710 (e.g., in write flag column 724 of the corresponding entry).

At step 812, the data stored in the first physical register is copied to the second physical register. For example, with reference to FIG. 7, execution logic 714 copies data stored in the first physical register (e.g., P3) to the second physical register (e.g., P5).

At step 814, the map table is not updated. For example, with reference to FIG. 7, map table 710 is not updated.

As described above, in certain scenarios, both the first instruction of the first instruction set and the second instruction of the second instruction set is configured to write data to the logical register. In such a scenario step 806 may be followed by step 816 shown in FIG. 8B.

At step 816, a determination is made as to whether both the first instruction and the second instruction are configured to write data to the logical register and the predicate result of the predicate instruction is the first result. For example, with reference to FIG. 7, decode logic 706 may be determine whether both the first instruction and the second instruction are configured to write data to the logical register and the predicate result of the predicate instruction is the first result. If a determination is made that both the first instruction and the second instruction are configured to write data to the logical register and the predicate result of the predicate instruction is the first result, flow continues to step 818. Otherwise, flow continues to step 822.

At step 818, the first instruction is executed and the write flag is set. For example, with reference to FIG. 7, execution logic 814 executes the first instruction and sets the write flag in map table 710 (e.g., in write flag column 724 of the corresponding entry).

At step 820, during evaluation of the second instruction, a determination is made that the write flag has been set and the data written to the second physical register by the first instruction is maintained. For example, with reference to FIG. 7, write flag check logic 716 of dispatch logic 712 determines that the write flag has been set in map table 710 and the data written to the second physical register by the first instruction is maintained.

At step 822, during evaluation of the first instruction, a determination is made that the write flag has not been set, and the data stored in the first physical register is copied to the second physical register. For example, with reference to FIG. 7, write flag check logic 716 of dispatch logic 712 may determine that the write flag has not been set in map table 710 (e.g., in write flag column 724 of entry 716B), and execution logic 714 may copy the data stored in the first physical register (e.g., P3) to the second physical register (e.g., P5).

At step 824, during evaluation of the second instruction, a determination is made that the write flag has not been set, the second instruction is executed, and the write flag is set. For example, with reference to FIG. 7, write flag check logic 716 of dispatch logic 712 may determine that the write flag has not been set, and execution logic 714 may execute the second instruction and set the write flag in map table 710.

D. Additional Enhancements

1. Explicit Predication

Determining whether a write instruction is actually going to be executed or not may not be immediately known if it is implicitly predicated (i.e., its producer is explicitly predicated). In the above example code sequence, instruction I[5] is such an instruction. Such instructions can be detected by "walking" the dependence chain when the predicate result arrives at the explicitly predicated instruction. The decode logic (e.g., decode logic 706) can iteratively use the targets of the such instructions to identify the next set of instructions. In the example code sequence above, when instruction I[4] receives the predicate result (in its predicate buffer (e.g., predicate buffer 236, as shown in FIG. 2)) and it is determined that is it is not to be executed, the decode logic can use targets encoded in instruction I[4] to transitively find instructions that are dependent thereon (e.g., instruction I[5]) to determine whether any of the dependent instructions are instructions configured to write to a logical register (and that will not execute due to the predicate result not being evaluated accordingly). While such a technique is effective, it can be compute intensive, depending on the number of dependent instructions between the explicitly predicated instruction and the write instruction.

Figure 9:
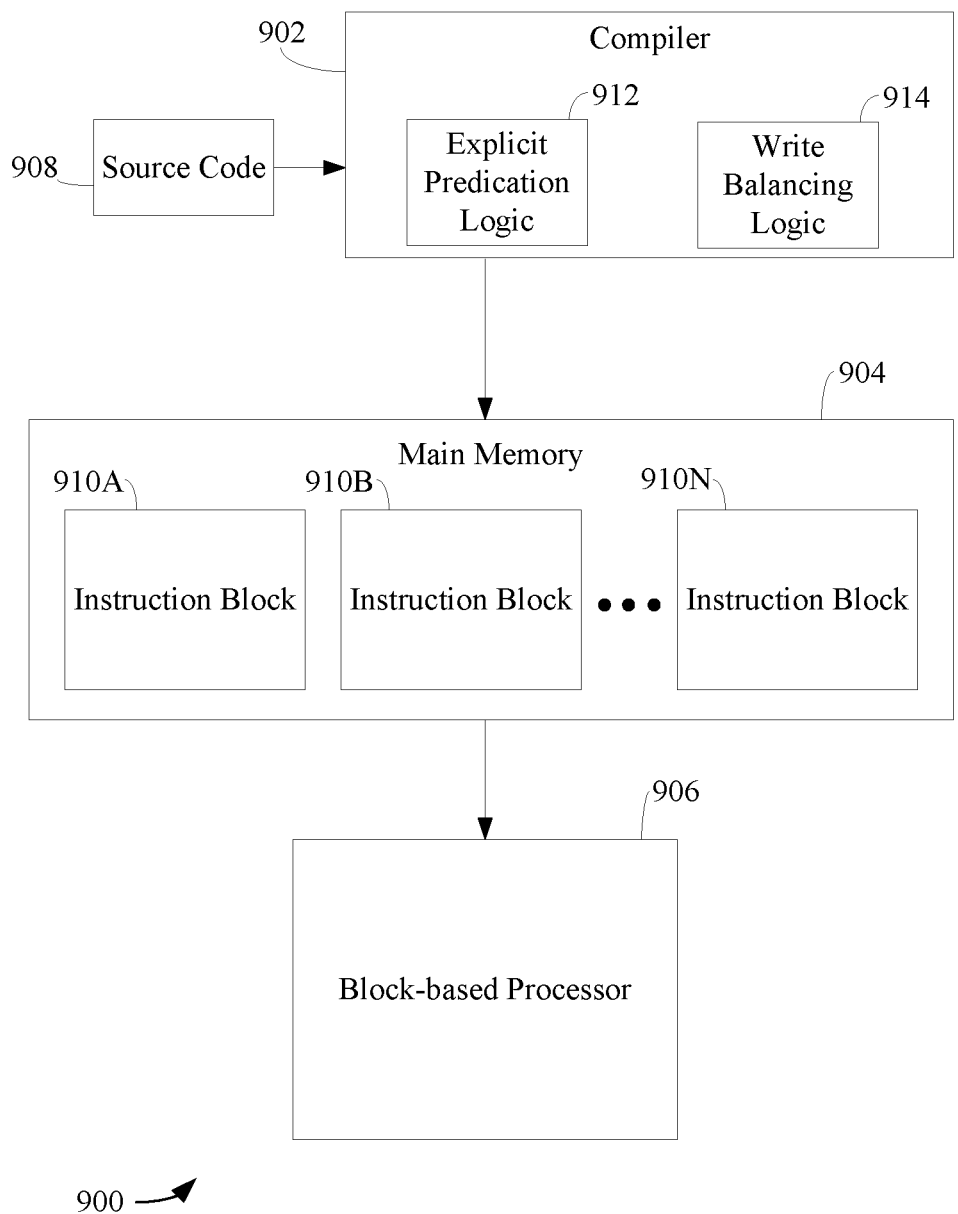
FIG. 9 depicts a block diagram of a system configured to explicitly predicate write instructions, according to an example embodiment.

In accordance with an embodiment, a compiler is utilized to explicitly predicate implicitly predicated write instructions. For example, FIG. 9 is a block diagram of a system 900 configured to explicitly predicate write instructions in accordance with an embodiment. As shown in FIG. 9, system 900 includes a compiler 902, main memory 904, and a block-based processor 906. Main memory 904 is an example of main memory 112 (as shown in FIG. 1), and block-based processor 906 is an example of block-based processor 102 (as shown in FIG. 1). Compiler 902 may be configured to compile source code 908 to a low-level assembly language and/or machine code. The low-level assembly language and/or machine code may be in accordance with the instruction set architecture utilized by block-based processor 906. Compiler 902 may group instructions into instruction blocks 910A-910N and store instruction blocks 910A-910N in main memory 904. Block-based processor 906 may be configured to retrieve and execute instruction blocks 910A-910N in accordance with the embodiments described herein. It is noted that compiler 902 may be executed on the same device or on a different device in which block-based processor 906 and main memory 904 are included.

Compiler 902 may comprise explicit predication logic 910. Explicit predication logic 910 may be configured to detect implicitly predicated write instructions. For example, explicit predication logic 910 may analyze an instruction block to determine an instruction that is explicitly predicated on a predicate instruction and determine whether any instructions are dependent on the explicitly predicated instruction (e.g., by analyzing the targets of such instructions). If such implicitly predicated instructions are determined, explicit predication logic 910 may determine whether any of the implicitly predicated instructions are configured to write data to a logical register. In response to determining that an instruction is configured to write data to a logical register, explicit predication logic 910 may explicitly predicate that instruction.

In accordance with an embodiment, the instruction is modified such that the result of the predicate result evaluation of the predicate instruction is provided directly to the modified instruction (i.e., the predicate result is provided to the predicate buffer (e.g., predicate buffer 236, as described above with reference to FIG. 2). For instance, consider the following code sequence:

| I[2]: | add | I[3].0 |
| I[3]: | lei | #5, I[4], I[6] |

| I[4]: | pt.add | I[5] |
| --- | --- | --- |
| I[5]: | st | R1 |
| I[6]: | pf.addi | R1, #4, R3 |

Explicit predication logic 912 may determine that instruction I[5] is implicitly predicated and modify instruction I[5] to as follows:

I[5]: pt.st R1

By adding "pt.", instruction I[5] is now explicitly predicated on predicate instruction I[3] and will directly receive the predicate result of the predicate evaluation of instruction I[3]. This advantageously enables the decode logic (e.g., decode logic 706) of block-based processor 906 to quickly determine whether a write instruction is to execute or not. Block-based processor 906 may utilize the techniques described above in Subsection C to determine whether register values should be copied based on a write flag. It is noted that instruction I[5] may be modified in any manner and the usage of "pt." is merely exemplary.

In accordance with another embodiment, explicit predication logic 912 may insert a null instruction after the predicate instruction such that it executes when the predicate result is the second result (e.g., false). For example, consider the following code sequence:

| I[2]: | add | I[3].0 |
| --- | --- | --- |
| I[3]: | lei | #5, I[4], I[6] |
| I[4]: | pt.add | I[5] |
| I[5]: | st | R1 |
| I[6]: | pf.... | |
| ... | | |
| I[9]: | addi | R1, #4, R3 |

In the example shown above, instruction I[9] is implicitly predicated on predicate instruction I[3] such that it executes when the predicate result evaluated by instruction I[3] is false. To enable the decode logic to quickly identify and evaluate instruction I[9], explicit predication logic 912 may insert a null instruction as follows:

| I[2]: | add | I[3].0 |
| --- | --- | --- |
| I[3]: | lei | #5, I[4], I[6] |
| I[3].1 | pf.null | I[9] |
| I[4]: | pt.add | I[5] |
| I[5]: | st | R1 |
| I[6]: | pf.... | |
| ... | | |
| I[9]: | addi | R1, #4, R3 |

As shown above, instruction I[3].1 is added after predicate instruction I[3]. Instruction I[3].1 is explicitly predicated on predicate instruction I[3]. Instruction I[3].1 is configured to execute when the predicate result evaluated by instruction I[3] is the second result (e.g., false). That is, the predicate result evaluated by the predicate is provided to the predicate buffer (e.g., predicate buffer 236) of the null instruction I[3].1 Null instruction I[3].1 explicitly decodes target instruction I[9]. Thus, when null instruction I[3].1 executes, the dispatch logic (e.g., dispatch logic 712, as shown in FIG. 7) of block-based processor 906 may immediately determine that instruction I[9] is not to be executed. Furthermore, in a scenario where the predicate result evaluated by the predicate instruction is true and where register R1 has been renamed from P3 to P5, the execution logic (e.g., execution logic 714, as shown in FIG. 7) of block-based processor 906 may copy the data stored in P3 to P5 in accordance with the techniques described above in Subsection C. The foregoing techniques advantageously enable the decode logic to identify predicated instructions that are not going to execute without having to evaluate intermediate instructions between the null instruction I[3].1 and instruction I[9].

2. Write Balancing

In accordance with an embodiment, in addition and/or in lieu of the embodiments described above, compiler 902 may insert a write instruction that is configured to copy data between registers. For instance, consider the following sequence of instructions:

| I[2]: | add | I[3].0 |
| --- | --- | --- |
| I[3]: | lei | #5, I[4], I[6] |
| I[4]: | pt.add | I[5] |
| I[5]: | st | R1 |
| I[6]: | pf.ld | R6, I[7].0 |

In the instructions above, if the predicate result evaluated by instruction I[3] is true, instructions I[4] and I[5] will execute. Instruction I[5] is configured to write to logical register R1. If the predicate result evaluated by instruction I[3] evaluates to false, instruction I[6] will execute, which reads the value stored in logical register R6 into the first operand of another instruction (i.e., instruction I[7]). In the sequence above, the only instruction configured to write to R1 is instruction I[5] (which is only written to if the predicate result evaluated by instruction I[3] is true). As described above with reference to FIG. 7, during the decode of the instruction sequence, decode logic 706 remaps logical register R1 from being associated with a first physical register (e.g., P3) to second physical register (e.g., P5). In the event that the predicate result evaluated by instruction I[3] is true, instruction I[5] executes and commits, P5 is written with the result of the addition instruction of instruction I[4], and execution logic 714 may set a write flag in write flag column 724 of entry 716B in map table 710, thereby indicating that P5 was written to. In this case, subsequent instruction blocks will receive the correct value for instructions that utilize logical register R1 (i.e., the value stored in P5) and no further action is required.

However, suppose the predicate result evaluated by instruction I[3] is false. In this case, instruction I[5] would not execute and commit, and the write flag would not be set. However, because decode logic 706 has renamed register R1 to P5 during the decode of the instructions, instructions of subsequent instruction blocks that reference R1 would utilize the value stored in P5, which, in this case, would not store the correct value because instruction I[5] did not execute. As described above, this problem may be resolved by copying the data stored in the old physical register (i.e., P3) is copied to the new physical register (i.e. P5). This copy may occur as a result of a write instruction inserted by compiler 902.

For instance, compiler 902 may comprise write balancing logic 914. Write balancing logic 914 may be configured to analyze an instruction block and determine whether there is a write imbalance. For example, in the code sequence above, there is a write imbalance because instruction I[6] does not write to R1. That is, both branches do not include an instruction configured to write to the same logical register. To remedy this imbalance, write balancing logic 914 may insert a write instruction configured to copy data between the old physical register (i.e., P3) to the newly-assigned physical register (i.e., P5). The instruction may be inserted as the last instruction in the branch that did not include the write instruction. For example, the following code sequence includes the inserted instruction:

| I[2]: | add    | I[3].0        |
|-------|--------|---------------|
| I[3]: | lei    | #5, I[4], I[6]|
| I[4]: | pt.add | I[5]          |
| I[5]: | st     | R1            |
| I[6]: | pf.ld  | R6, I[7].0    |
| ...   |        |               |
| I[8]: | st     | R1, R1        |

In this case, instruction I[8] has been added. Instruction I[8] is configured to copy the value stored in R1 to R1. In particular, instruction I[8] specifies the logical register as the source operand and specifies the logical register as the target operand. The logical register specified for the source operand is equal to the value of R1 at the time the instruction block was fetched (which is stored in P3), and the logical register specified for the target operand is associated with the new physical register via map table 710 (i.e., the new physical register mapped to R1 (i.e., P5)). The foregoing technique advantageously does not require block-based processor 906 to include additional logic to perform the old physical register-to-new physical register copy, as the copy is performed as a result of executing a write instruction.

III. Example Computer System Implementation

The systems and methods described above, may be implemented in hardware, or hardware combined with one or both of software and/or firmware. For example, compiler 902 may be implemented as computer program code/instructions configured to be executed in one or more processors and stored in a computer readable storage medium. Alternatively, compiler 902 may be implemented in one or more SoCs (system on chip). An SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 10:
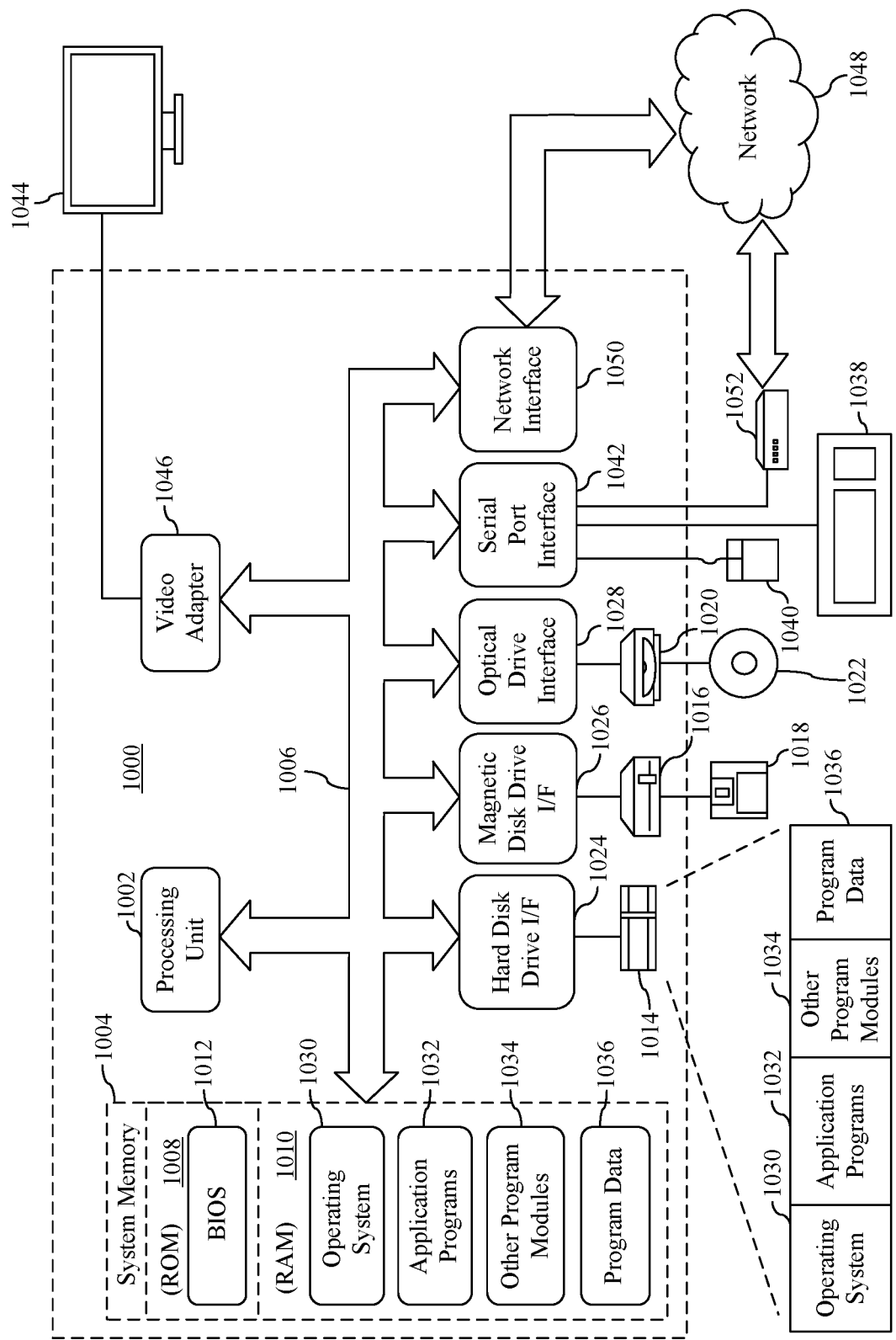
FIG. 10 is a block diagram of an example computing device that may be used to implement embodiments.

Furthermore, FIG. 10 depicts an exemplary implementation of a computing device 1000 in which embodiments may be implemented, including block-based processor 102, memory system 104, processing core 200, processing core 400, processing core 500, processing core 700, compiler 902, main memory 904, block-based processor 906, and/or each of the components described therein, and flowchart 300, flowchart 600, and/or flowcharts 800A and 800B.

The description of computing device 1000 provided herein is provided for purposes of illustration, and is not intended to be limiting. Embodiments may be implemented in further types of computer systems, as would be known to persons skilled in the relevant art(s).

As shown in FIG. 10, computing device 1000 includes one or more processors, referred to as processor circuit 1002, a system memory 1004, and a bus 1006 that couples various system components including system memory 1004 to processor circuit 1002. Each of block-based processor 102, processing core 200, processing core 400, processing core 500, processing core 700, and, block-based processor 906 may be examples of processor circuit 1002. Main memory 112 may be an example of system memory 1004. Buses 120A-120B may be an example of bus 1006. Processor circuit 1002 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1002 may execute program code stored in a computer readable medium, such as program code of operating system 1030, application programs 1032, other programs 1034, etc. Bus 1006 represents one or more of any of several types of bus structures, including a memory bus or memory controller, a peripheral bus, an accelerated graphics port, and a processor or local bus using any of a variety of bus architectures. System memory 1004 includes read only memory (ROM) 1008 and random access memory (RAM) 1010. A basic input/output system 1012 (BIOS) is stored in ROM 1008.

Computing device 1000 also has one or more of the following drives: a disk drive 1014 for reading from and writing to a hard disk or a solid state drive, a magnetic disk drive 1016 for reading from or writing to a removable magnetic disk 1018, and an optical disk drive 1020 for reading from or writing to a removable optical disk 1022 such as a CD ROM, DVD ROM, or other optical media. Hard disk drive 1014, magnetic disk drive 1016, and optical disk drive 1020 are connected to bus 1006 by a hard disk drive interface 1024, a magnetic disk drive interface 1026, and an optical drive interface 1028, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 1030, one or more application programs 1032, other programs 1034, and program data 1036. Application programs 1032 or other programs 1034 may include, for example, computer program logic (e.g., computer program code or instructions) for implementing the systems described above, including the software-based techniques described in reference to FIG. 9.

A user may enter commands and information into the computing device 1000 through input devices such as keyboard 1038 and pointing device 1040. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1002 through a serial port interface 1042 that is coupled to bus 1006, but may be connected by other interfaces, such as a parallel port, game port, or a universal serial bus (USB).

A display screen 1044 is also connected to bus 1006 via an interface, such as a video adapter 1046. Display screen 1044 may be external to, or incorporated in computing device 1000. Display screen 1044 may display information, as well as being a user interface for receiving user commands and/or other information (e.g., by touch, finger gestures, virtual keyboard, etc.). In addition to display screen 1044, computing device 1000 may include other peripheral output devices (not shown) such as speakers and printers.

Computing device 1000 is connected to a network 1048 (e.g., the Internet) through an adaptor or network interface 1050, a modem 1052, or other means for establishing communications over the network. Modem 1052, which may be internal or external, may be connected to bus 1006 via serial port interface 1042, as shown in FIG. 10, or may be connected to bus 1006 using another interface type, including a parallel interface.

As used herein, the terms "computer program medium," "computer-readable medium," and "computer-readable storage medium" are used to generally refer to physical hardware media such as the hard disk associated with hard disk drive 1014, removable magnetic disk 1018, removable optical disk 1022, other physical hardware media such as RAMs, ROMs, flash memory cards, digital video disks, zip disks, MEMs, nanotechnology-based storage devices, and further types of physical/tangible hardware storage media (including system memory 1004 of FIG. 10). Such computer-readable storage media are distinguished from and non-overlapping with communication media (do not include communication media or modulated data signals). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media.

As noted above, computer programs and modules (including application programs 1032 and other programs 1034) may be stored on the hard disk, magnetic disk, optical disk, ROM, RAM, or other hardware storage medium. Such computer programs may also be received via network interface 1050, serial port interface 1042, or any other interface type. Such computer programs, when executed or loaded by an application, enable computing device 1000 to implement features of embodiments discussed herein. Accordingly, such computer programs represent controllers of the computing device 1000.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Additional Exemplary Embodiments

A method implemented by a block-based processor configured to execute instruction blocks that each include a plurality of instructions is described herein. The method includes fetching a first instruction block from a memory coupled to the block-based processor, the first instruction block comprising: a predicate instruction configured to evaluate a predicate result, a first instruction set configured to execute based on the predicate result being a first result, and a second instruction set configured to execute based on the predicate result being a second result; determining that an instruction of the first instruction set is configured to write data to a logical register; allocating a first physical register of the block-based processor for the determined instruction to which the data is to be written; determining whether the predicate result of the predicate instruction is the first result; and in response to determining that the predicate result of the predicate instruction evaluates to the first result, updating a map table that associates the logical register to a second physical register of the block-based processor to associate the logical register to the first physical register, the map table configured to be utilized by a second instruction block.

In one embodiment of the foregoing method, the method further comprises: in response to determining that predicate result of the predicate instruction is the second result, deallocating the first physical register of the block-based processor.

In another embodiment of the foregoing method, instructions in the second instruction block that are configured to read data from the logical register are suspended from executing until the instruction of the first instruction block commits.

In a further embodiment of the foregoing method, the second instruction block utilizes the updated map table when the determined instruction of the first instruction set executes and commits responsive to determining that the predicate result of the predicate instruction is the first result.

Another method implemented by a block-based processor configured to execute instruction blocks that each include a plurality of instructions is described herein. The method includes fetching a first instruction block from a memory coupled to the block-based processor, the first instruction block comprising: a predicate instruction configured to evaluate a predicate result, a first instruction set configured to execute based on the predicate result being a first result, and a second instruction set configured to execute based on the predicate result being a second result; determining that an instruction of the first instruction set is configured to write data to a logical register; updating a map table that associates the logical register to a first physical register of the block-based processor to associate the logical register to a second physical register of the block-based processor, the map table utilized by a second instruction block; determining whether the determined instruction commits; and in response to determining that the determined instruction does not commit, negating said updating.

In an embodiment of the foregoing method, said negating comprises rolling back said updating so that the map table associates the logical register to the first physical register.

In still another embodiment of the foregoing method, said negating comprises copying data stored in the first physical register to the second physical register.

In another embodiment of the foregoing method, said determining whether the determined instruction of the first instruction set commits comprises: determining whether a write flag associated with the logical register is set in the map table.

In yet another embodiment of the foregoing method, the write flag is set in response to the determined instruction being committed.

In a further embodiment of the foregoing method, the method further comprises: in response to determining that the determined instruction commits, maintaining said updating of the map table.

In yet another embodiment of the foregoing method, the determined instruction does not commit in response to the predicate result being the second result.

A block-based processor is also described herein. The block-based processor comprises: a plurality of physical registers; fetch logic configured to fetch an instruction block from a memory coupled to the block-based processor, the instruction block comprising: a predicate instruction configured to evaluate a predicate result, a first instruction set configured to execute based on the predicate result being a first result, and a second instruction set configured to execute based on the predicate result being a second result; decode logic configured to: determine whether a first instruction of the first instruction set is configured to write data to a logical register and whether a second instruction of the second instruction set is configured to write data to the logical register, and in response to a determination that at least one of the first instruction or the second instruction is configured to write data to the logical register, update a map table that associates the logical register to a first physical register of the plurality of physical registers to associate the logical register to a second physical register of the plurality of physical registers; and execution logic configured to: in response to a determination that the first instruction is configured to write data and that the predicate result of the predicate instruction is the first result, execute the first instruction and set a write flag associated with the logical register in the map table, the write flag indicating that the instruction has committed.

In one embodiment of the block-based processor, the execution logic is further configured to: in response to a determination that the first instruction is configured to write data to the logical register and that the predicate result of the predicate instruction is the second result, copy data stored in the first physical register to the second physical register.

In another embodiment of the block-based processor, the execution logic is further configured to: in response to a determination that both the first instruction and the second instruction are configured to write data to the logical register and the predicate result of the predicate instruction evaluates to the first result, execute the first instruction and set the write flag; and wherein the block-based processor further comprises dispatch logic configured to: during evaluation of the second instruction, determine that the write flag has been set; and maintain the data written to the second physical register by the first instruction.

In yet another embodiment of the block-based processor, the dispatch logic is further configured to: in response to a determination that both the first instruction and the second instruction are configured to write data to the logical register and the predicate result of the predicate instruction is the second result: during evaluation of the first instruction, determine that the write flag has not been set, wherein the execution logic is further configured to copy data stored in the first physical register to the second physical register; and during evaluation of the second instruction, determine that the write flag has not been set, wherein the execution logic is further configured to execute the second instruction and set the write flag.

In still another embodiment of the block-based processor, at least one of the first instruction or the second instruction is modified by a compiler to be explicitly predicated such that the predicate result of the predicate instruction is provided to the at least one of the modified first instruction or the modified second instruction.

In another embodiment of the block-based processor, the execution logic is further configured to: in response to a determination that the first instruction is configured to write data to the logical register and that the predicate result of the predicate instruction is the second result, execute a null instruction inserted by a compiler before the first instruction, the null instruction specifying the first instruction and enabling dispatch logic of the block-based processor to evaluate the first instruction and enabling the execution logic to copy data stored in the first physical register to the second physical register without evaluating intermediate instructions between the null instruction and the first instruction.

In still another embodiment of the block-based processor, the null instruction is explicitly predicated such that the predicate result of the predicate instruction is provided to the null instruction.

In yet another embodiment of the block-based processor, the execution logic is configured to copy the data stored in the first physical register to the second physical register by executing a write instruction inserted by the compiler after the first instruction.

In still another embodiment of the block-based processor, the write instruction specifies the logical register as the source operand and specifies the logical register as the target operand, and wherein the logical register specified for the target operand is associated with the second physical register via the map table.

V. CONCLUSION

While various embodiments have been described above, it should be understood that they have been presented by way of example only, and not limitation. It will be understood by those skilled in the relevant art(s) that various changes in form and details may be made therein without departing from the spirit and scope of the disclosed embodiments as defined in the appended claims. Accordingly, the breadth and scope of the present embodiments should not be limited by any of the above-described exemplary embodiments, but should be defined only in accordance with the following claims and their equivalents.

What is claimed is:

1. A method implemented by a block-based processor configured to execute instruction blocks that each include a plurality of instructions, the method comprising:
    fetching a first instruction block from a memory coupled to the block-based processor, the first instruction block comprising:
        a predicate instruction configured to evaluate a predicate result,
        a first instruction set configured to execute based on the predicate result being a first result, and
        a second instruction set configured to execute based on the predicate result being a second result;
    determining that an instruction of the first instruction set is configured to write data to a logical register;
    allocating a first physical register of the block-based processor for the determined instruction to which the data is to be written;
    determining whether the predicate result of the predicate instruction is the first result; and
    in response to determining that the predicate result of the predicate instruction is the first result and after the instruction of the first instruction set has committed, updating a map table, that previously-assigned the logical register to a second physical register of the block-based processor, to assign the logical register to the first physical register, the map table configured to be utilized by a second instruction block.

2. The method of claim 1, further comprising:
    in response to determining that predicate result of the predicate instruction is the second result, deallocating the first physical register of the block-based processor.

3. The method of claim 1, wherein instructions in the second instruction block that are configured to read data from the logical register are suspended from executing until the instruction of the first instruction block commits.

4. The method of claim 3, wherein the second instruction block utilizes the updated map table when the determined instruction of the first instruction set executes and commits responsive to determining that the predicate result of the predicate instruction is the first result.

5. A method implemented by a block-based processor configured to execute instruction blocks that each include a plurality of instructions, the method comprising:
fetching a first instruction block from a memory coupled to the block-based processor, the first instruction block comprising:
a predicate instruction configured to evaluate a predicate result,
a first instruction set configured to execute based on the predicate result being a first result, and
a second instruction set configured to execute based on the predicate result being a second result;
determining that an instruction of the first instruction set is configured to write data to a logical register;
updating a map table, that previously-assigned the logical register to a first physical register of the block-based processor, to assign the logical register to a second physical register of the block-based processor, the map table utilized by a second instruction block;
determining whether the determined instruction commits; and
in response to determining that the determined instruction does not commit, rolling back said updating so that the map table assigns the logical register to the first physical register.

6. The method of claim 5, wherein said determining whether the determined instruction of the first instruction set commits comprises:
determining whether a write flag associated with the logical register is set in the map table.

7. The method of claim 6, wherein the write flag is set in response to the determined instruction being committed.

8. The method of claim 5, further comprising:
in response to determining that the determined instruction commits, maintaining said updating of the map table.

9. The method of claim 5, wherein the determined instruction does not commit in response to the predicate result being the second result.

10. The method of claim 5, wherein the map table is maintained by a register file.

11. The method of claim 10, wherein said rolling back comprises:
providing a control signal to the register file that causes the logical register to be assigned to the first physical register.

12. A block-based processor, comprising:
a plurality of physical registers;
fetch logic configured to fetch an instruction block from a memory coupled to the block-based processor, the instruction block comprising:
a predicate instruction configured to evaluate a predicate result,
a first instruction set configured to execute based on the predicate result being a first result, and
a second instruction set configured to execute based on the predicate result being a second result;
decode logic configured to:
determine whether a first instruction of the first instruction set is configured to write data to a logical register and whether a second instruction of the second instruction set is configured to write data to the logical register, and
in response to a determination that at least one of the first instruction or the second instruction is configured to write data to the logical register, update a map table, that previously-assigned the logical register to a first physical register of the plurality of physical registers, to assign the logical register to a second physical register of the plurality of physical registers; and
execution logic configured to:
in response to a determination that the first instruction is configured to write data and that the predicate result of the predicate instruction is the first result, execute the first instruction and set a write flag associated with the logical register in the map table, the write flag indicating that the instruction has committed; and
in response to a determination that the first instruction is configured to write data to the logical register and that the predicate result of the predicate instruction is the second result, copy data stored in the first physical register to the second physical register.

13. The block-based processor of claim 12, wherein the execution logic is further configured to:
in response to a determination that both the first instruction and the second instruction are configured to write data to the logical register and the predicate result of the predicate instruction evaluates to the first result, execute the first instruction and set the write flag; and
wherein the block-based processor further comprises dispatch logic configured to:
during evaluation of the second instruction, determine that the write flag has been set; and
maintain the data written to the second physical register by the first instruction.

14. The block-based processor of claim 12, wherein the dispatch logic is further configured to:
in response to a determination that both the first instruction and the second instruction are configured to write data to the logical register and the predicate result of the predicate instruction is the second result:
during evaluation of the first instruction, determine that the write flag has not been set, wherein the execution logic is further configured to copy data stored in the first physical register to the second physical register; and
during evaluation of the second instruction, determine that the write flag has not been set, wherein the execution logic is further configured to execute the second instruction and set the write flag.

15. The block-based processor of claim 12, wherein at least one of the first instruction or the second instruction is modified by a compiler to be explicitly predicated such that the predicate result of the predicate instruction is provided to the at least one of the modified first instruction or the modified second instruction.

16. The block-based processor of claim 12, wherein the execution logic is further configured to:
in response to a determination that the first instruction is configured to write data to the logical register and that the predicate result of the predicate instruction is the second result, execute a null instruction inserted by a compiler before the first instruction, the null instruction specifying the first instruction and enabling dispatch logic of the block-based processor to evaluate the first instruction and enabling the execution logic to copy data stored in the first physical register to the second physical register without evaluating intermediate instructions between the null instruction and the first instruction.

17. The block-based processor of claim 16, wherein the null instruction is explicitly predicated such that the predicate result of the predicate instruction is provided to the null instruction.

18. The block-based processor of claim 12, wherein the execution logic is configured to copy the data stored in the first physical register to the second physical register by executing a write instruction inserted by the compiler after the first instruction.

19. The block-based processor of claim 18, wherein the write instruction specifies the logical register as the source operand and specifies the logical register as the target operand, and wherein the logical register specified for the target operand is associated with the second physical register via the map table.

20. The block-based processor of claim 12, wherein the map table is maintained by a register file.

* * * * *